United States Patent
Choi et al.

(10) Patent No.: US 10,375,710 B2
(45) Date of Patent: Aug. 6, 2019

(54) METHOD AND APPARATUS FOR CONNECTING DEVICES USING BLUETOOTH LOW-ENERGY TECHNOLOGY

(71) Applicant: LG ELECTRONICS INC., Seoul (KR)

(72) Inventors: Jingu Choi, Seoul (KR); Hyeonjae Lee, Seoul (KR); Minsoo Lee, Seoul (KR); Younghwan Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/566,520

(22) PCT Filed: Apr. 12, 2016

(86) PCT No.: PCT/KR2016/003840
§ 371 (c)(1),
(2) Date: Oct. 13, 2017

(87) PCT Pub. No.: WO2016/167541
PCT Pub. Date: Oct. 20, 2016

(65) Prior Publication Data
US 2018/0098338 A1    Apr. 5, 2018

Related U.S. Application Data

(60) Provisional application No. 62/146,930, filed on Apr. 13, 2015.

(51) Int. Cl.
*H04W 72/12* (2009.01)
*H04W 76/10* (2018.01)
(Continued)

(52) U.S. Cl.
CPC ......... *H04W 72/1205* (2013.01); *H04L 29/08* (2013.01); *H04W 4/00* (2013.01);
(Continued)

(58) Field of Classification Search
CPC ......... H04W 72/1205; H04W 28/0215; H04W 8/005; H04W 76/14; H04W 4/80;
(Continued)

(56) References Cited

U.S. PATENT DOCUMENTS

| 2011/0021142 A1* | 1/2011 | Desai ............. H04W 8/005 455/41.2 |
| 2013/0003630 A1 | 1/2013 | Xhafa et al. |
| 2013/0090061 A1 | 4/2013 | Linde |

FOREIGN PATENT DOCUMENTS

| EP | 2800409 A1 | 11/2014 |
| WO | WO 2013/177792 A1 | 12/2013 |

* cited by examiner

*Primary Examiner* — Dady Chery
(74) *Attorney, Agent, or Firm* — Birch, Stewart, Kolasch & Birch, LLP

(57) ABSTRACT

The present invention relates to a method and an apparatus for connecting a first device to a second device using Bluetooth low energy (LE). According to the present invention, provided are a method and an apparatus which receive, from the second device, a first advertising message comprising first interval information indicative of the transmission interval of the advertising message; adjust the size of a scan window for searching for peripheral devices on the basis of the first advertising message; receive a second advertising message from the second device or an external device via the scan window; and establish a Bluetooth LE connection with the second device if the transmission interval indicated by the interval information is the same as the interval at which the first advertising message and the second advertising message are transmitted.

12 Claims, 38 Drawing Sheets

(51) Int. Cl.
  *H04L 29/08* (2006.01)
  *H04W 4/00* (2018.01)
  *H04W 76/14* (2018.01)
  *H04W 4/80* (2018.01)
  *H04W 8/00* (2009.01)
  *H04W 28/02* (2009.01)
  *H04W 72/04* (2009.01)

(52) U.S. Cl.
  CPC .............. *H04W 4/80* (2018.02); *H04W 8/005* (2013.01); *H04W 28/0215* (2013.01); *H04W 76/10* (2018.02); *H04W 76/14* (2018.02); *H04W 72/0453* (2013.01)

(58) Field of Classification Search
  CPC ... H04W 76/10; H04W 4/00; H04W 72/0453; H04L 29/08
  See application file for complete search history.

FIG. 9

| Case | | Description |
|---|---|---|
| Search procedure | If a device having Advertising Time off is present in a search range | If a target search device is not searched for within Advertising Time off, provide notification of whether the Advertising function of a target search device will be activated. Change a Scan Window by considering the largest Advertising_interval in a device within a search range (e.g., extend the Scan Window to the largest Advertising_interval+10ms) |
| | If a device having Advertising Time off is not present in a search range | Change a Scan Window by considering the largest Advertising_interval in a device within a search range (e.g., extend the Scan Window to the largest Advertising_interval+10ms) |
| Connection procedure | If a device to be connected has Advertising Time off | If the Advertising of a device to be connected is not received within Advertising Time off, provide notification of whether the Advertising function of a target connection device will be activated. Change a Scan Window by considering the Advertising_interval of a device to be connected (e.g., extend the Scan Window to Advertising_interval+10ms) |
| | If a device to be connected does not have Advertising Time off | Change a Scan Window by considering the Advertising_interval of a device to be connected (e.g., extend the Scan Window to Advertising_interval+10ms) |
| Enhanced security connection | If a device, that is, a target of security connection, has Advertising Time off | If the Advertising of a device, that is, a target of security connection, is not received within Advertising Time off, provide notification of whether the Advertising function of a target connection device will be activated. |
| | If a device, that is, a target of security connection, does not have Advertising Time off | Even after the Advertising of a device, that is, a target of security connection, is received, additionally scan for time corresponding to a set Security Scan Window size. Request a connection after a specific time since the last Advertising packet is received. Provide notification of impossible connection if Advertising_interval is not identical with the period in which actual Advertising is received during a Security Scan Window. |

FIG. 25

| | Length(1octet) | AD type(1octet) | AD data(9octets) |
|---|---|---|---|
| Sample | 0x0A | 0x2A(TBD) | Below table |
| Description | 10 octets | <<Service Discovery Data>> | Organization Frame |

| | Organization ID (1octet) | SDS Flags(1octet) | Length(1octet) | SDS Flags(1octet) | | |
|---|---|---|---|---|---|---|
| Sample | 0x01 | (msb)0b00000001 (lsb)→0x29 | 0x05 | 0b ...00000101 (TBD) → 0x00000005 (4octets) | 0x05 (TBD) | |
| Description | Bluetooth SIG:0x01 | Provider(Bits0-1:0b01) Scanning Disabled(Bit:2:0) Additional Data in GATT(Bit3:1) On and TU(Bit4-5:0b10) RFU(Bit6-7:0b00) | Length 5 octets | BR/EDR Profile Selector In this example, below 2 are available - A2DP - Headset Profile | Hint of DU 5 sec (Only if On and TU) | |

FIG. 26

|  | Length(1octet) | AD type(1octet) | AD data(1octets) |
|---|---|---|---|
| Sample | 0x02 | 0x01 | 0x02 | 0x04 (Bitwise OR) |
| Description | Length 2 octet | <<Flags>> | LE General Discoverable Mode BR/EDR Not Supported |

```
//Flag type
adv_data_cp.data[0] = 0x02;     /* Field length */
adv_data_cp.data[1] = 0x01;     /* Flags */
adv_data_cp.data[2] = 0x02;     /* LE General Discoverable Mode */
adv_data_cp.data[2] |= 0x04;    /* BR/EDR Not Supported */
```

(a) Flag setting

```
bdaddr_le.b[5] &= 0x3f;
//set Random Address
rg.ogf = OGF_LE_CTL;
rg.ogf = OGF_LE_SET_RANDOM_ADDRESS;
rg.cparam = &bdaddr_le;
rg.clen = LE_SET_RAMDOM_ADDRESS_CP_SIZE;
rg.rparam = &status;
rg.rlen = 1;

ret = hci_send_req(dd, &rp, 1000);
```

(b) Random Address Setting

FIG. 27

|  | Length(1octet) | AD type(1octet) | AD data(11octets) |
|---|---|---|---|
| Sample | 0x0C | 0x09 | 0x 52 61 73 70 62 65 72 72 79 50 69 |
| Description | Length 12 octets | <<Complete Local Name>> | Raspberrypi |

(a) Device name

|  | Length(1octet) | AD type(1octet) | AD data(3octets) |
|---|---|---|---|
| Sample | 0x04 | 0x0D | 0x 200418 (headphone) |
| Description | Length 4 octets | <<Class of Device>> | Major Service Class<br>Major Device Class<br>Minor Device Class Filed |

(b) Device type

FIG. 29

| Specification Name | Specification Type | Assigned Number |
|---|---|---|
| Generic Access | org.bluetooth.service.generic_access | 0x1800 |
| Generic Attribute | org.bluetooth.service.generic_attribute | 0x1800 |
| Tx Power | org.bluetooth.service.tx_power | 0x1804 |
| Service Discovery | org.bluetooth.service.service_discovery | 0x7700 |

(a) Service

| Specification Name | Assigned Number | Properties | Interface | Parameter Example |
|---|---|---|---|---|
| HID Control Point (example) | 0x2A4C | Write | – | – |
| Handover Control Point | 0x88a5 | Write | All | 19byte Organization BR/EDR A2DP, Wi-Fi Direct Miracast |
| BD_ADDR (6byte) | 0x77a1 | Read | BR/EDR | 08:EF:3B:B0:11:32 (Bluetooth Dongle) |
| Class of Device (3byte) | 0x77a2 | Read | BR/EDR | Projector |
| Clock Offset | 0x77a3 | Read | BR/EDR | |
| Device ID (6byte) | 0x88a1 | Read | Wi-Fi Direct | 64:e5:99:fa:25:26 (Wi-Fi Dongle) |
| Country String (3byte) | 0x88a2 | Read | Wi-Fi Direct | USA, Europe, ... |
| Operating Class (1byte) | 0x88a3 | Read | Wi-Fi Direct | 12 (2.407GHz, 20MHz CH Spacing, Channel set) |
| Channel Number (1byte) | 0x88a4 | Read | Wi-Fi Direct | |
| Service Hash, Advertisement ID | 0x88a5 | Write | Wi-Fi Direct | |

(b) Characteristic

FIG. 30

```
//jingu.choi 20150213 Service and Characteristice Add
static void populate_dot_service(struct server *server)
{
  bt_uuid_t uuid;
  struct gatt_db_attribute *service, *tmp;
  unit16_t appearance;

/* Add the DoT service */
  bt_uuid16_create(&uuid, UUID_SERVICE_DOT);
  //handle may be size of charactristice added?
  // 2 Characteristic
  service = gatt_db_add_service(server->db, &uuid, true, 15);

/*
   *FHS. Make the value dynamically read and
   * written via callbacks.
   */
  fprintf(stderr, "DoT Service Adding...\n");

bt_uuid16_create(&uuid, UUID_CHAR_WFDLISTENCH);
  gatt_db_service_add_characteristic(service, &uuid,
          BT_ATT_PERM_READ | BT_ATT_PERM_WRITE,
          BT_GATT_CHRC_PROP_READ | BT_GATT_CHRC_PROP_WRITE,
          dot_read_cb,
          dot_write_cb,
          server);

// gatt_db_attribute_get_handle (tmp);

bt_uuid16_create(&uuid, UUID_CHAR_WFDGOVALUE);
  gatt_db_service_add_characteristic(service, &uuid,
          BT_ATT_PERM_READ | BT_ATT_PERM_WRITE,
          BT_GATT_CHRC_PROP_READ | BT_GATT_CHRC_PROP_WRITE,
          dot_read_cb,
          dot_write_cb,
          server);
```

GATT Server

FIG. 31

```
//jingu.choi 20150115 Service and Characteristice Add!!
//DoT service 1
//DoT Temporary Charcteristic 5
public static final String STRING_UUID_SERVICE_DOT = "00007777-0000-1000-8000-00805f9b34fb";

public static final String STRING_UUID_CHAR_FHS                 = "000077a1-0000-1000-8000-00805f9b34fb";
public static final String STRING_UUID_CHAR_CHANNEL_MAP         = "000077a2-0000-1000-8000-00805f9b34fb";
public static final String STRING_UUID_CHAR_TRANSMISSION_POWER  = "000077a3-0000-1000-8000-00805f9b34fb";
public static final String STRING_UUID_CHAR_CONNECTION_STATUS   = "000077a4-0000-1000-8000-00805f9b34fb";
public static final String STRING_UUID_CHAR_HANDOVER            = "000077a5-0000-1000-8000-00805f9b34fb";

//jingu.choi 20150213 for WFD, GATT Configuration-------
public static final String STRING_UUID_CHAR_WFDLISTENCH = "000088a1-0000-1000-8000-00805f9b34fb";
public static final String STRING_UUID_CHAR_WFDGOVAKUE  = "000088a2-0000-1000-8000-00805f9b34fb";
public static final String STRING_UUID_CHAR_WFDSSID     = "000088a3-0000-1000-8000-00805f9b34fb";
public static final String STRING_UUID_CHAR_WFDBSSID    = "000088a4-0000-1000-8000-00805f9b34fb";
public static final String STRING_UUID_CHAR_WFDHANDOVER = "000088a5-0000-1000-8000-00805f9b34fb";

public static final UUID UUID_CHAR_WFDLISTENCH  = UUID.fromString(STRING_UUID_CHAR_WFDLISTENCH);
public static final UUID UUID_CHAR_WFDGOVAKUE   = UUID.fromString(STRING_UUID_CHAR_WFDGOVAKUE);
public static final UUID UUID_CHAR_WFDSSID      = UUID.fromString(STRING_UUID_CHAR_WFDSSID);
public static final UUID UUID_CHAR_WFDBSSID     = UUID.fromString(STRING_UUID_CHAR_WFDBSSID);
public static final UUID UUID_CHAR_WFDHANDOVER  = UUID.fromString(STRING_UUID_CHAR_WFDHANDOVER);

public static final ParcelUuid PARCEL_UUID_CHAR_WFDLISTENCH  = ParcelUuid.fromString(STRING_UUID_CHAR_WFDLISTENCH);
public static final ParcelUuid PARCEL_UUID_CHAR_WFDGOVAKUE   = ParcelUuid.fromString(STRING_UUID_CHAR_WFDGOVAKUE);
public static final ParcelUuid PARCEL_UUID_CHAR_WFDSSID      = ParcelUuid.fromString(STRING_UUID_CHAR_WFDSSID);
public static final ParcelUuid PARCEL_UUID_CHAR_WFDBSSID     = ParcelUuid.fromString(STRING_UUID_CHAR_WFDBSSID);
public static final ParcelUuid PARCEL_UUID_CHAR_WFDHANDOVER  = ParcelUuid.fromString(STRING_UUID_CHAR_WFDHANDOVER);

GATT Client
```

METHOD AND APPARATUS FOR CONNECTING DEVICES USING BLUETOOTH LOW-ENERGY TECHNOLOGY

CROSS REFERENCE TO RELATED APPLICATIONS

This application is the National Phase of PCT International Application No. PCT/KR2016/003840, filed on Apr. 12, 2016, which claims priority under 35 U.S.C. 119(e) to U.S. Provisional Application No. 62/146,930, filed on Apr. 13, 2015, all of which are hereby expressly incorporated by reference into the present application.

TECHNICAL FIELD

The present invention relates to a method and device for forming a connection between devices using Bluetooth, that is, a short-distance technology, in a wireless communication system and, more particularly, to a method and device for forming a connection between devices by controlling a device search period using a Bluetooth low energy (BLE) technology.

BACKGROUND ART

Bluetooth is a short-range wireless technology standard that can wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

Here, the user may discover a Bluetooth device according to a Bluetooth communication method intended to be used using the Bluetooth device, and subsequently perform a connection.

The Bluetooth communication method may be divided into a BR/EDR method and an LE method. The BR/EDR method may be called Bluetooth Classic. The Bluetooth Classic method includes a Bluetooth technology subsequent from Bluetooth 1.0 and a Bluetooth technology using the enhanced data rate (EDR) supported by Bluetooth 2.0 or a subsequent version.

A Bluetooth low energy (LE) technology applied, starting from Bluetooth 4.0, may stably provide information of hundreds of kilobytes (KB) with low power consumption. Such a Bluetooth low energy technology allows devices to exchange information with each other using an attribute protocol. The Bluetooth LE method can reduce energy consumption by reducing overhead of a header and simplifying an operation.

Some of Bluetooth devices do not have a display or a user interface. The complexity of connection/management/control/disconnection between various types of Bluetooth devices and some of the Bluetooth devices using similar technologies has increased.

Bluetooth supports a high speed with relatively low power consumption at relatively low cost. However, since Bluetooth has a maximum transmission distance limited to 100 m, it is appropriately used within a limited space.

DISCLOSURE

Technical Problem

An object of the present invention is to provide a method for connecting devices using a Bluetooth low energy (LE) technology.

Furthermore, an object of the present invention is to provide a method for connecting devices by controlling the scanning time of a device using a Bluetooth low energy (LE) technology.

Furthermore, an object of the present invention is to provide a method for connecting to a required device by controlling the scanning time of a device using a Bluetooth low energy (LE) technology.

Furthermore, an object of the present invention is to provide a method for preventing a connection from an external device by controlling a scanning time using a Bluetooth low energy (LE) technology.

Furthermore, an object of the present invention is to provide a method for rapidly connecting devices by transmitting information related to the period in which an advertising message is transmitted using a Bluetooth low energy (LE) technology.

Furthermore, an object of the present invention is to provide a method for obtaining substitution communication means and service information and activating a substitution communication means connection and service using a Bluetooth low energy (LE) technology.

Technical objects to be achieved in this specification are not limited to the aforementioned objects, and other technological objects not described above may be evidently understood by a person having ordinary skill in the art to which the present invention pertains from the following description.

Technical Solution

The present invention provides a method for controlling, by a first device, a second device using a Bluetooth low energy (LE) technology for accomplishing the objects.

Specifically, a method for controlling, by a first device, a second device using a Bluetooth low energy (LE) technology according to an embodiment of the present invention includes the steps of receiving a first advertising message including first interval information indicating the transmission interval of an advertising message from the second device; controlling the size of a scan window for scanning a surrounding device based on the first advertising message; receiving a second advertising message from the second device or an external device through the scan window; and establishing a Bluetooth LE connection with the second device when the transmission interval indicated by the interval information is identical with an interval in which the first advertising message and the second advertising message are transmitted.

Furthermore, the present invention further includes the step of dropping the second advertising message when the transmission interval indicated by the first interval information is not identical with the interval in which the first advertising message and the second advertising message are transmitted.

Furthermore, the present invention further includes the steps of receiving a third advertising message from the second device and establishing a Bluetooth LE connection with the second device.

Furthermore, in the present invention, the first advertising message further includes second interval information indicating the advertising message transmission interval of a third device.

Furthermore, in the present invention, the size of the scan window is controlled based on at least one of the first interval information and the second interval information.

Furthermore, the present invention further includes the steps of transmitting a scan request message requesting additional information to the second device and receiving a scan response message including the additional information in response to the scan request message.

Furthermore, the present invention further includes the steps of receiving at least one of active period information indicating the period in which the second device transmits the advertising message or sleep period information indicating the period in which the second device does not transmit the advertising message from the second device; and controlling the size of the scan window based on at least one of the active period information or the sleep period information.

Furthermore, in the present invention, the first advertising message further includes at least one network information supported by the second device.

Furthermore, the present invention provides a device including a communication unit for communicating with the outside in a wired or wireless manner and a processor functionally connected to the communication unit, wherein the processor is configured to receive a first advertising message including first interval information indicating the transmission interval of an advertising message from the second device, adjust the size of a scan window for scanning a surrounding device based on the first advertising message, receive a second advertising message from the second device or an external device through the scan window, and establish a Bluetooth LE connection with the second device when the transmission interval indicated by the interval information is identical with an interval in which the first advertising message and the second advertising message are transmitted.

Furthermore, in the present invention, the processor is further configured to drop the second advertising message when the transmission interval indicated by the first interval information is not identical with the interval in which the first advertising message and the second advertising message are transmitted.

Advantageous Effects

In accordance with the method for connecting devices using a Bluetooth low energy (LE) technology according to an embodiment of the present invention, there is an effect in that a connection between devices can be efficiently performed.

Furthermore, in accordance with the present invention, there is an effect in that a required device can be rapidly connected by controlling the scanning time of the device using a Bluetooth low energy (LE) technology.

Furthermore, in accordance with the present invention, there is an effect in that devices can be rapidly connected by transmitting information related to the period in which an advertising message is transmitted using a Bluetooth low energy (LE) technology.

Furthermore, in accordance with the present invention, there is an effect in that a connection from a device that fakes another device can be prevented by controlling the scanning time of the device using a Bluetooth low energy (LE) technology.

Furthermore, in accordance with the present invention, there is an effect in that a connection from a device that fakes another device can be prevented by transmitting information related to the period in which an advertising message is transmitted using a Bluetooth low energy (LE) technology.

Furthermore, in accordance with the present invention, there is an effect in that substitution communication means and service information can be obtained and a substitution communication means connection and service can be activated using a Bluetooth low energy (LE) technology.

Effects which may be obtained in this specification are not limited to the aforementioned effects, and other effects not described above may be evidently understood by a person having ordinary skill in the art to which the present invention pertains from the following description.

DESCRIPTION OF DRAWINGS

FIGS. 8 and 9 are diagrams showing examples of an advertising event and a scanning event for scanning a device in Bluetooth LE.

FIGS. 24 to 27 are diagrams showing a method for obtaining information of substitution communication means through Bluetooth LE and examples of a data format according to embodiments of the present invention.

FIGS. 28 to 31 are diagrams showing a method for handover to substitution communication means through Bluetooth LE and examples of a data format according to embodiments of the present invention.

MODE FOR INVENTION

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, a terminal related to the present invention will be described in detail with reference to the accompanying drawings. In the following description, usage of suffixes such as 'module', 'part' or 'unit' used for referring to elements is given merely to facilitate explanation of the present invention, without having any significant meaning by itself.

Figure 1:
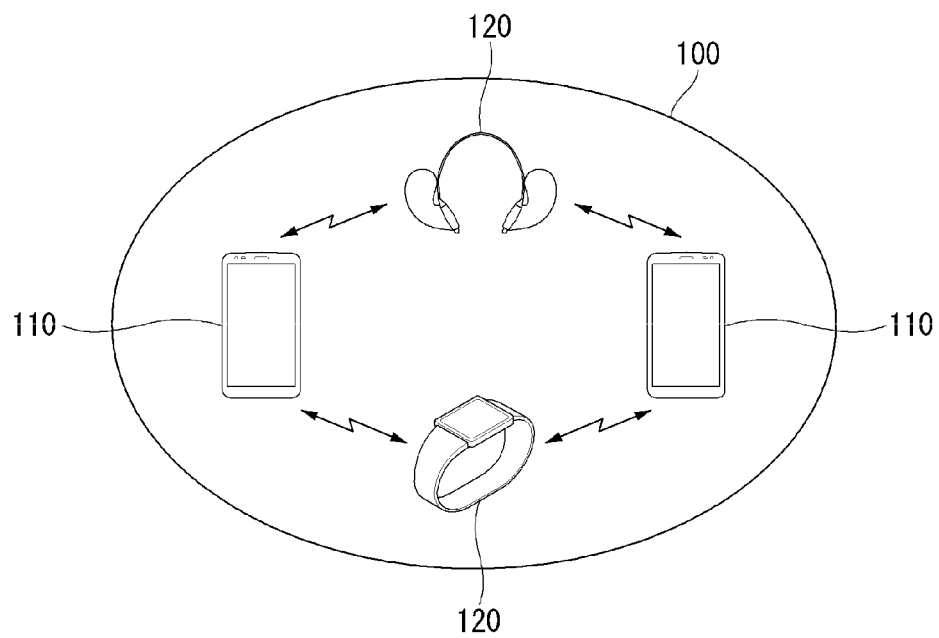
FIG. 1 is a schematic diagram showing an example of a wireless communication system using a Bluetooth low energy technology, which is proposed in this specification.

FIG. 1 is a schematic diagram showing an example of a wireless communication system using a Bluetooth low energy technology, which is proposed in this specification.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may be expressed as a data service device, a slave device, a slave, a server, a conductor, a hot device, a gateway, a sensing device, a monitoring device, a first device, a second device or the like.

The client device 110 may be expressed as a master device, a master, a client, a member, a sensor device, a sink device, a collector, a third device, a fourth device or the like.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Also, in order to provide data information to the client device, the server device sends a notification message or an indication message to the client device in order to provide data information to the client device. Also, the server device receives a confirmation message corresponding to the indication message from the client device.

Also, in the process of transmitting and receiving notification, indication, and confirmation messages to and from the client device, the server device may provide data information to a user through an output unit or may receive a request input from the user through a user input interface.

Also, in the process of transmitting and receiving message to and from the client device, the server device may read data from a memory unit or may write new data to the corresponding memory unit.

Also, the single server device may be connected with a plurality of client devices, and may be easily re-connected with client devices using bonding information.

The client device 120 refers to a device which requests data information and data transmission from the server device.

The client device receives data through a notification message or an indication message from the server device, and when an indication message is received from the server device, the client device sends an acknowledgement message in response to the indication message.

Similarly, in the process of transmitting and receiving messages to and from the server device, the client device may also provide information to the user through an output unit or may receive an input from the user through a user input interface.

Also, in the process of transmitting and receiving messages with the server device, the client device may read data from a memory unit or may write new data to the corresponding memory unit.

Hardware components such as the output units, the user input interfaces, and the memory units of the server device and the client device will be described in detail with reference to FIG. 2.

Also, the wireless communication system may configure personal area networking (PAN) through the Bluetooth technology. For example, in the wireless communication system, a private piconet may be established between devices to quickly and safely exchange files, documents, and the like.

Figure 2:
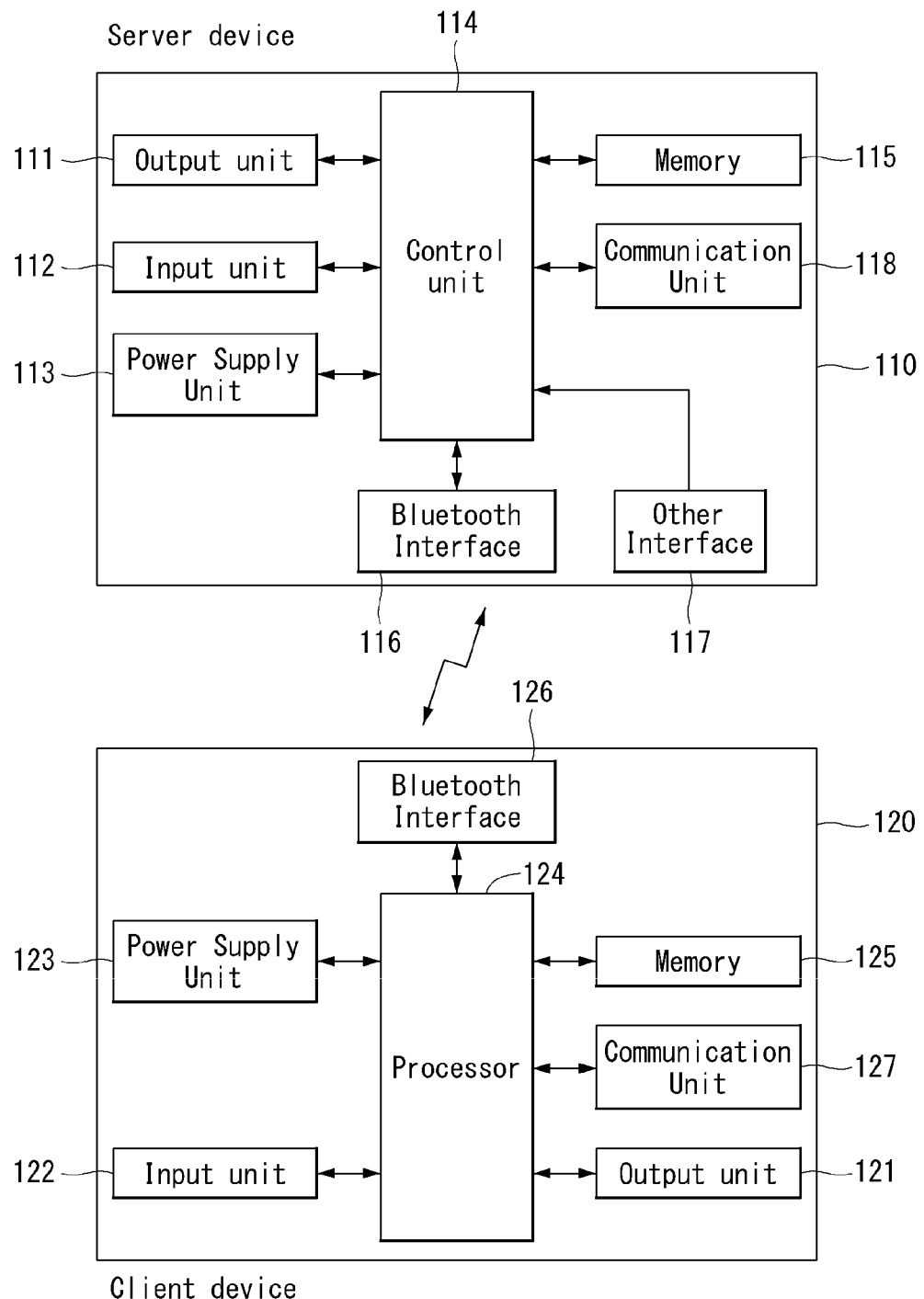
FIG. 2 shows an example of an internal block diagram of a device which may implement methods proposed in this specification.

FIG. 2 shows an example of an internal block diagram of a device which may implement methods proposed in this specification.

As illustrated in FIG. 2, a server device includes an output unit 111, a user input interface 112, a power supply unit 113, a processor 114, a memory unit 115, a Bluetooth interface 116, other interface 117, and a communication unit (or transceiver unit) 118.

The output unit 111, the user input interface 112, the power supply unit 113, the processor 114, the memory unit 115, the Bluetooth interface 116, other interface 117 and the communication unit 118 are functionally connected to perform a method proposed in this specification.

Also, the client device includes an output unit 121, a user input interface 122, a power supply unit 123, a processor 124, a memory unit 125, a Bluetooth interface 126, and a communication unit (or transceiver unit) 127.

The output unit 121, the user input interface 122, the power supply unit 123, the processor 124, the memory unit 125, the Bluetooth interface 126, other interface 127, and the communication unit 127 are functionally connected to each other to perform a method proposed in this specification.

The Bluetooth interfaces 116 and 126 refer to units (or modules) able to transmit data such as a request/a response, a command, a notification, an indication/confirmation message between devices.

The memory units 115 and 126 are units implemented in various types of devices, in which various types of data are stored.

The processors 114 and 124 refer to modules controlling a general operation of the server device or the client device, which control requesting transmission of a message through the Bluetooth interface and other interface and processing a received message therethrough.

The processors 114 and 124 may also be termed a controller, a control unit, and the like.

The processors 114 and 124 may include an application-specific integrated circuit (ASIC), other chip set, a logic circuit and/or data processing unit.

The processors 114 and 124 control the communication units to receive an advertising message from the server device, control the communication unit to transmit a scan request message to the server device and receive a scan response message as a response to the scan request from the server device, and control the communication unit to transmit a connection request message to the server device in order to establish a Bluetooth connection with the server device.

Also, after the Bluetooth LE connection is established through the connection procedure, the processors 114 and 124 control the communication units to read or write data by using an attribute protocol from the server device The memory units 115 and 125 may include a read-only memory (ROM), a random access memory (RAM), a flash memory, a memory card, a storage medium and/or other storage device.

The communication units 118 and 127 may include a baseband circuit for processing a wireless signal. When an embodiment is implemented by software, the aforementioned technique may be implemented as a module (process, function, etc.) performing the aforementioned function. The module may be stored in a memory unit and may be executed by a processor.

The memory units 115 may be present within or outside of the processors 114 and 124, and may be connected to the processors 114 and 124 through various well-known units.

The output units 111 and 121 refer to modules providing status information of the devices, message exchange information, and the like, to the user through a screen.

The power supply units 113 and 123 refer to modules receiving external power or internal power and supplying power required for operations of the respective components under the control of the controllers 114 and 124.

As discussed above, in the BLE technology, a duty cycle is small and power consumption may be significantly reduced through a low data rate, and thus, the power supply unit may supply power required for operations of the respective components even with small output power (10 mW (10 dBm) or less).

The user input interfaces 112 and 122 refer to modules providing a user input such as a screen button to the controllers to enable the user to control an operation of the devices.

Figure 3:
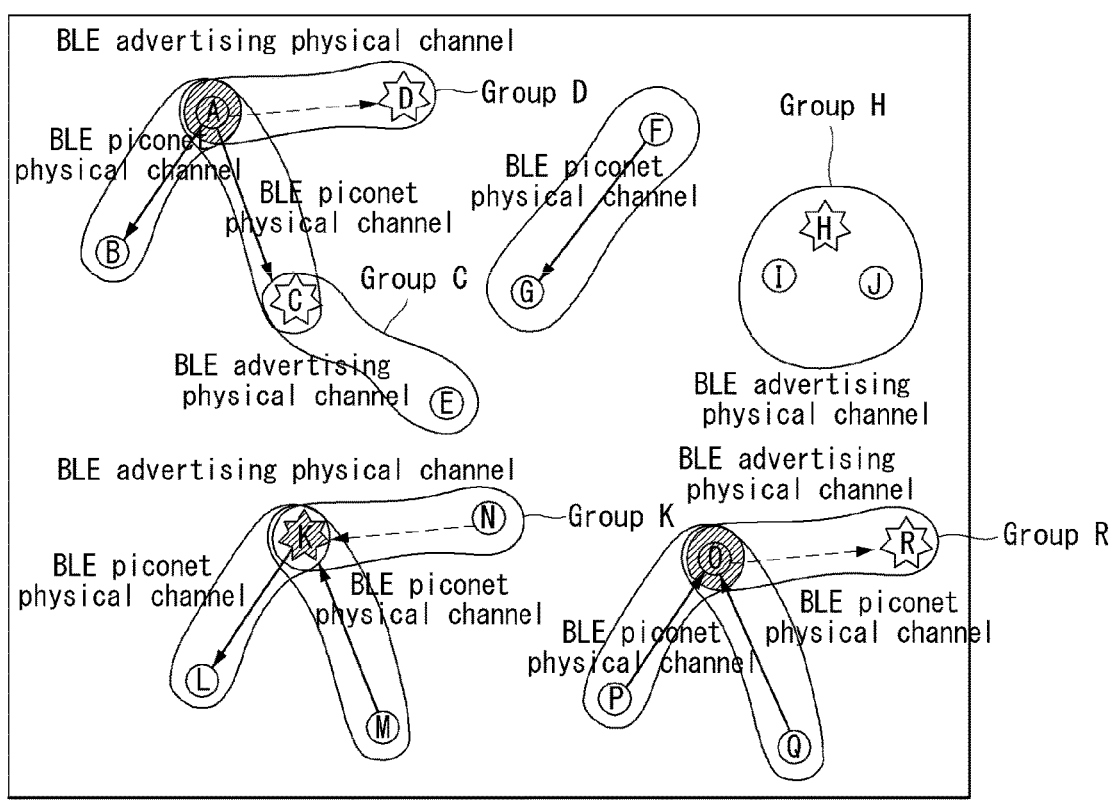
FIG. 3 shows an example of a Bluetooth low energy topology.

FIG. 3 shows an example of a Bluetooth low energy topology.

Referring to FIG. 3, a device A corresponds to a master in a piconet (piconet A, the shaded portion) having a device B and a device C as slaves.

Here, the piconet refers to an aggregation of devices in which any one of them is a mater and the other devices occupy a shared physical channel connected to the master device.

The BLE slave does not share a common physical channel with the master. Each of the slaves communicates with the master trough a separate physical channel. There is another piconet (piconet F) having a master device F and a slave device G.

A device K is present in a scatternet K. Here, the scatternet refers to a group of piconets connected to other piconets.

The device K is a master of a device L and a slave of a device M.

A device O is also in the scatter net O. The device O is a slave of a device P and a slave of a device Q.

As illustrated in FIG. 2, five different device groups are present.

1. Device D is an advertiser and device A is an initiator (group D).
2. Device E is a scanner and Device C is an advertiser (group C).
3. Device H is an advertiser, and devices I and J are scanners (group H).
4. Device K is also an advertiser, and device N is an initiator (group K).
5. Device R is an advertiser, and device O is an initiator (group R).

The devices A and B use a single BLE piconet physical channel.

The devices A and C use another BLE piconet physical channel.

In group D, the device D advertises using an advertisement event connectable in an advertisement physical channel, and the device A is an initiator. The device A may establish a connection with the device D and add a device to the piconet A.

In group C, the device C advertises on an advertisement physical channel by using a certain type of an advertisement event captured by the scanner device E.

The group D and the group C may use different advertisement physical channels or different times in order to avoid collision.

In the piconet F, a single physical channel is present. The devices F and G use a single BLE piconet physical channel. The device F is a master, and the device G is a slave.

In group H, a single physical channel is present. The devices H, I, and J use a single BLE advertisement physical channel. The device H is an advertiser, and the devices I and J are scanners.

In the scatternet K, the devices K and L use a single BLE piconet physical channel. The devices K and M use another BLE piconet physical channel.

In group K, the device K advertises by using an advertisement event connectable on an advertisement physical channel, and the device N is an initiator. The device N may establish a connection with the device K. Here, the device K may be a slave of two devices and a master of one device at the same time.

In the scatternet O, the devices O and P use a single BLE piconet physical channel. The devices O and Q use another BLE piconet physical channel.

In group R, the device R advertises by using an advertisement event connectable on an advertisement physical channel, and the device O is an initiator. The device O may establish a connection with the device R. Here, the device O may be a slave of two devices and a master of one device at the same time.

Figure 4:
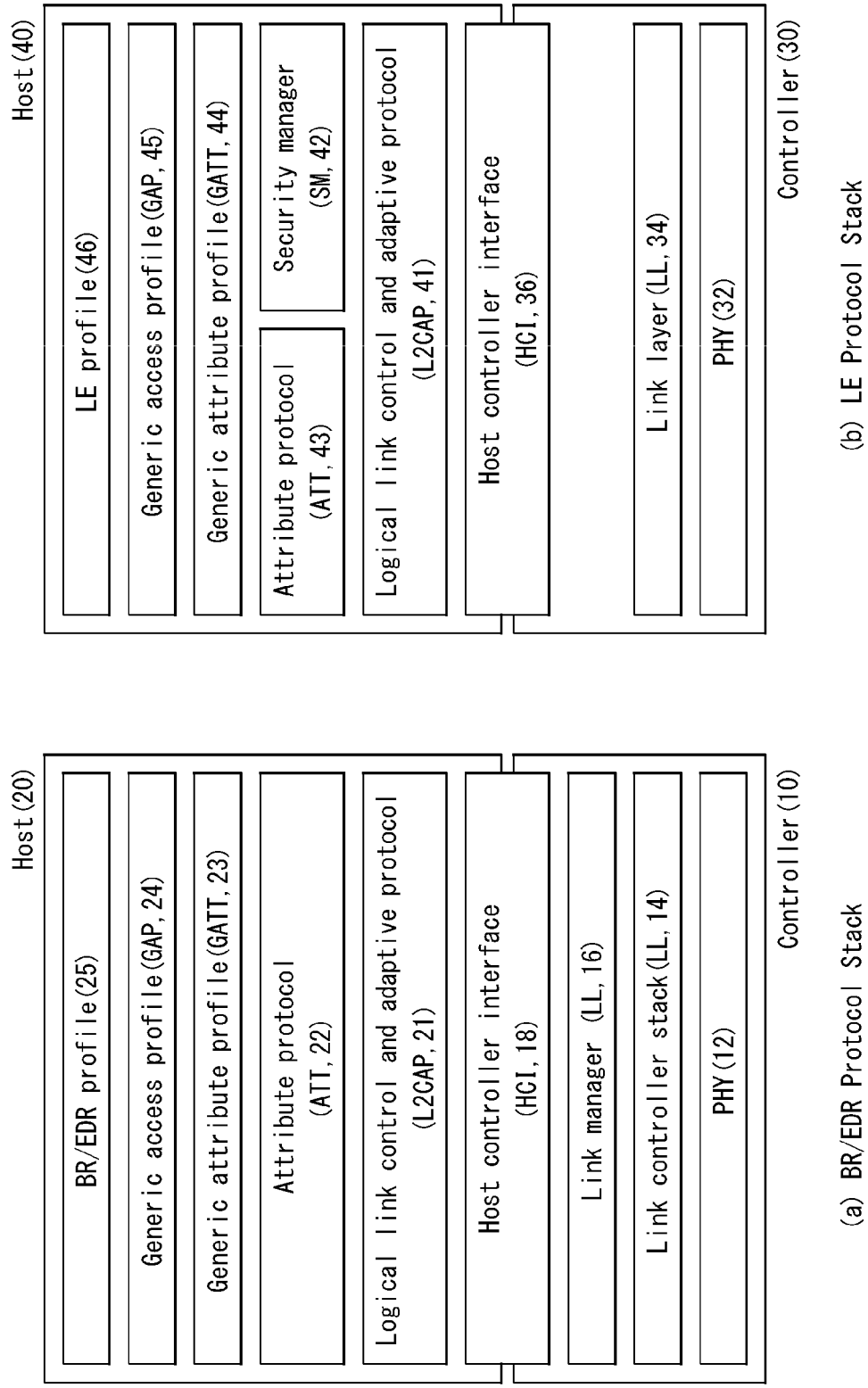
FIG. 4 is a diagram showing an example of Bluetooth communication architecture to which methods proposed in this specification has been applied.

FIG. 4 is a diagram showing an example of Bluetooth communication architecture to which methods proposed in this specification has been applied.

Referring to FIG. 4, FIG. 4 (*a*) shows an example of a protocol stack of Basic Rate (BR)/Enhanced Data Rate (EDR), and FIG. 4 (*b*) shows an example of a protocol stack of Bluetooth Low Energy (LE).

In detail, as illustrated in (a) of FIG. 4, the Bluetooth BR/EDR protocol stack may include an upper controller stack 10 and a lower host stack 20 with respect to a host controller interface (HCI) 18.

The host stack (or host module) 20 refers to hardware for transmitting or receiving a Bluetooth packet to and from a wireless transceiver module receiving a Bluetooth signal of 2.4 GHz, and is connected to a Bluetooth module, the controller stack 10, to control the Bluetooth module and performs an operation.

The host stack 20 may include a BR/EDR PHY layer 12, a BR/EDR Baseband layer 14 and a Link Manager layer 16.

The BR/EDR PHY layer 12 is the layer of transmitting and receiving a radio signals of 2.4 GHz, and may transmit data by hopping 79 RF channels in the case of using the Gaussian Frequency Shift Keying (GFSK) modulation.

The BR/EDR Baseband layer 14 plays the role of transmitting a Digital Signal, selects the channel sequence of hopping 1400 times per second, and transmits the time slot of 625 µs length for each channel.

The Link Manager layer 16 controls the entire operations (link setup, control and security) of a Bluetooth connection by utilizing the Link Manager Protocol (LMP).

The link manager layer 16 may perform the following functions.

The link manager layer 16 may perform ACL/SCO logical transport, logical link setup, and control Detach: The link manager layer 16 stops connection and informs a counterpart device about the reason for stopping connection.

The link manager layer 16 performs power control and role switch.

The link manager layer 16 performs security (authentication, pairing, encryption) function.

The host controller interface layer 18 provides an interface between the host module and the controller module to allow the host to provide a command and data to the controller and allow the controller to provide an event and data to the host.

The host stack (or host module) 20 includes a logical link control and adaptive protocol (L2CAP) 21, an attribute protocol (ATT) 22, a generic attribute profile (GATT) 23, a generic access profile (GAP) 24, and a BR/EDR profile 25.

The logical link control and adaptive protocol (L2CAP) 21 may provide a two-way channels for transmitting data to a specific protocol or a profile.

The L2CAP 21 may multiplex various protocols and profiles provided from a Bluetooth higher position.

The L2CAP of the Bluetooth BR/EDR uses a dynamic channel, supports a protocol service multiplexer, retransmission, and a streaming mode, and provides segmentation and reassembly, per-channel flow control, and error control.

The generic attribute profile (GATT) 23 may operate as a protocol how the attribute protocol 22 is used in configuring services. For example, the generic attribute profile 23 may operate how ATT attributes are grouped together with services, and operate to describe features associated with services.

Thus, the GATT 23 and the ATT 22 may use features in order to describe status and services of a device and describe how the features are related and used.

The attribute protocol 22 and the BR/EDR profile 25 define a service (profile) using the Bluetooth BR/EDR and define an application protocol for exchanging data, and the generic access profile (GAP) 24 defines device discovering, connecting a device and security level.

As illustrated in (b) of FIG. 4, the Bluetooth LE protocol stack includes a controller stack 30 operable to process a wireless device interface for which timing is important, and a host stack 40 operable to process high level data.

First, the controller stack 30 may be implemented by using a communication module that may include a Bluetooth wireless device, for example, a processor module that may include a processing device such as a microprocessor.

The host stack may be implemented as part of an OS operated on a processor module or may be implemented as instantiation of a package on the OS.

In some examples, the controller stack and the host stack may be operated or executed on the same processing device within a processor module.

The controller stack 30 includes a physical layer (PHY) 32, a link layer (LL) 34, and a host controller interface (HCI) 36.

The physical layer (PHY) (wireless transceiver module 32), a layer for transmitting and receiving a 2.4 GHz wireless signal, uses a Gaussian frequency shift keying (GFSK) modulation and a frequency hopping technique including forty RF channels.

The link layer 34 serving to transmit or receive a Bluetooth packet provides a function of generating a connection between devices after performing an advertising and scanning function using three advertising channels, and exchanging data packets of a maximum of 257 bytes through thirty-seven data channels.

The host stack may include the Generic Access Profile (GAP) 40, the logical link control and adaptation protocol (L2CAP) 41, the Security Manager (SM) 42, the Attribute Protocol (ATT) 440, the Generic Attribute Profile (GATT) 44, the Generic Access Profile 25 and the LE profile 46. However, the host stack 40 is not limited thereto, but may include other various protocols and profiles.

The host stack multiplexes various protocols and profiles provided from a Bluetooth higher position by using the L2CAP.

First, the L2CAP 41 may provide a single two-way channel for transmitting data to a specific protocol or profile.

The L2CAP 41 may operate to multiplex data between higher layer protocols, segment and reassemble packages, and manage a multicast data transmission.

In the Bluetooth LE, three fixed channels (one for a signaling channel, one for a security manager, and one for an attribute protocol) are basically used, and dynamic channel may be used as necessary.

In contrast, in the BR/EDR, a dynamic channel is basically used, and a protocol service multiplexer, retransmission, streaming mode, and the like, are supported.

The SM 42 is a protocol for certifying a device and providing a key distribution.

The ATT 43 defines a rule for accessing data of a counterpart device by a server-client structure. The ATT 43 includes six types of messages (request, response, command, notification, indication, and confirmation) as follows.

① Request and Response message: A request message is a message for a client device to request specific information from a server device, and the response message, as a response message with respect to the request message, refers to a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present invention, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

① Battery: Battery information exchanging method

② Time: Time information exchanging method

③ FindMe: Provision of alarm service according to distance

④ Proximity: Battery information exchanging method

⑤ Time: Time information exchanging method

The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertisement event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertising procedure to perform undirected broadcast to devices within a region.

Here, the undirected broadcast is advertising toward all the devices, rather than broadcast toward a specific device, and all the devices may scan advertising to make an additional information request or a connection request.

In contrast, directed advertising may make an additional information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertisement events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this specification.

Figure 5:
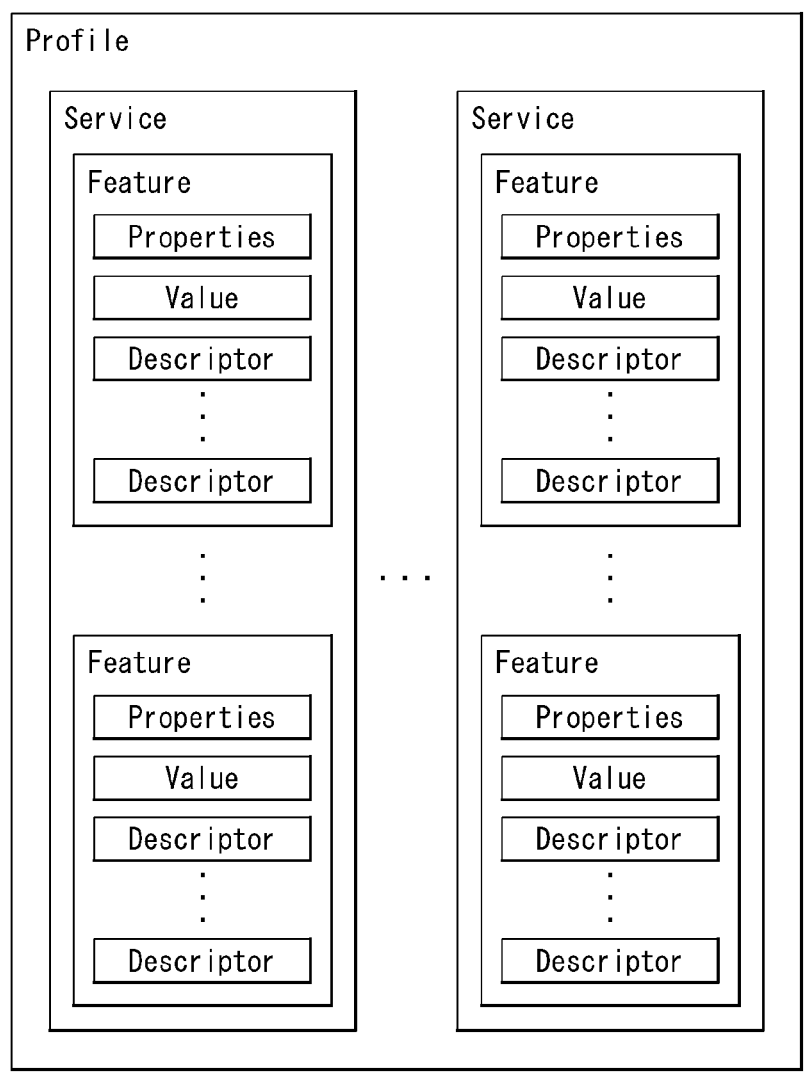
FIG. 5 is a diagram showing an example of the structure of a generic attribute profile (GATT) of Bluetooth low energy.

FIG. 5 is a diagram showing an example of the structure of a generic attribute profile (GATT) of Bluetooth low energy.

Referring to FIG. 5, the structure for exchange of Profile Data of Bluetooth Low Energy will be described.

In detail, the GATT defines a method for exchanging data using a service between Bluetooth LE devices and a characteristic.

In general, a peripheral device (for example, a sensor device) serves as a GATT server, and has definition regarding a service and a characteristic.

In order to read or write data, a GATT client sends a data request to the GATT server, and every operation (transaction) is started by the GATT client and a response is received from the GATT server.

A GATT-based operational structure used in the Bluetooth LE may be a vertical structure as illustrated in FIG. 5 on the basis of a profile, a service, and a characteristic.

The profile includes one or more services, and the services may include one or more characteristics or other services.

The service serves to divide data into logical units and may include one or more characteristics or other services, each of the services has a 16-bit or 128-bit identifier called a universal unique identifier (UUID)).

The characteristic is the lowermost unit in the GATT-based operational structure. The characteristic includes only one data, and has a 16-bit or 128-bit UUID, similar to the service.

The characteristic is defined by values of various types of information, and in order to hold each information, an attribute may be required for each information. The characteristic may use several continuous attributes.

The attribute has four components and has meanings as follows.

handle: Address of attribute

Type: Type of attribute

Value: Value of attribute

Permission: Right to access attribute

The present invention proposes a method in which a sensor measures and stores the activity of a person using the GATT-based operation structure of Bluetooth LE and a client fetches stored information from the sensor.

Figure 6:
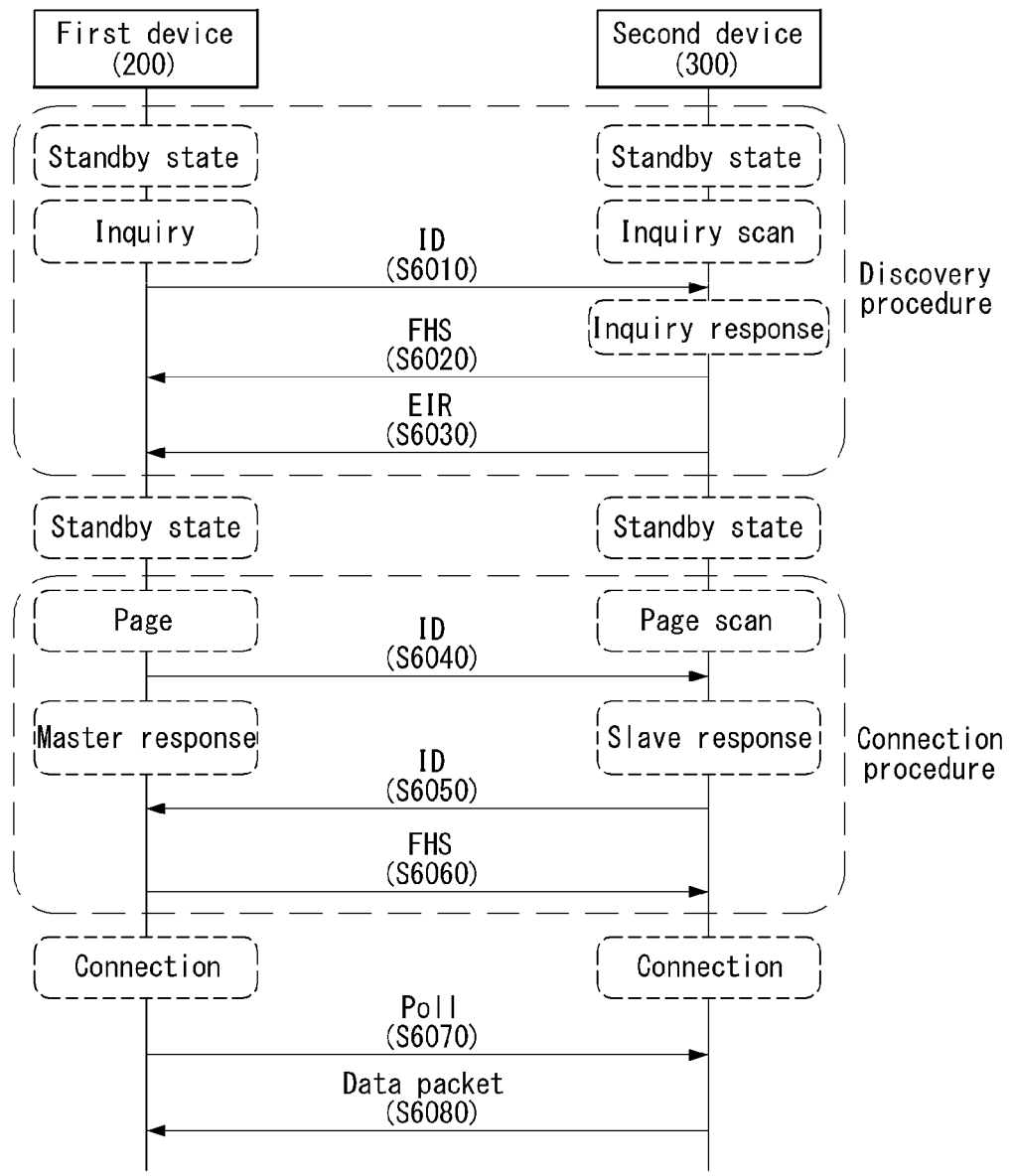
FIG. 6 is a diagram showing a search and connection procedure of Bluetooth BR/EDR.

FIG. 6 is a diagram showing a search and connection procedure of Bluetooth BR/EDR.

Discovery Procedure

The first device 200 and the second device 300 in the Bluetooth BR/EDR disconnection state exist in a standby state, and then for searching the Bluetooth BR/EDR, the first device 200 exists in an inquiry state and the second device 300 becomes an inquiry scan state.

In the inquiry state, the first device 200 transmits an ID packet to perform a Bluetooth BR/EDR discovery procedure (S6010), and in response to the inquiry, the first device 200 receives a frequency hop synchronization (FHS) packet from the second device 300 (S6020).

When the second device 300 intends to transmit additional information to the second device 300, the second device 300 may transmit the additional information to the first device 200 using an enhanced inquiry (EIR) packet (S6030).

When the first device 200 that verifies existence and information of other devices through such a search intends to be connected with the second device 300, the first device 200 performs a paging procedure.

Paging Procedure

In the paging procedure, the first device 200 enters a BR/EDR paging state and the second device 300 enters a paging scan state.

The first device 200 transmits an ID packet to the second device 300 in the paging state (S6040).

When the second device 300 receives the ID packet transmitted by the first device, the first device 200 enters a BR/EDR master response state in the BR/EDR paging state and the second device 300 enters a BR/EDR slave state in the BR/EDR paging state.

Thereafter, the first device 200 transmits a second ID packet in a channel transmitting the ID packet (S6050).

The second device 300 receiving the second ID packet transmits a frequency hopping synchronization (FHS) packet to the first device 200 for frequency synchronization (S6060).

When the paging procedure is completed, the first device 200 and the second device 300 are switched to the BR/EDR connection state.

Thereafter, the second device 300 is switched to a hopping pattern of the first device 200, and in order to verify this, the first device 200 transmits a Poll packet to the second device 300 (S6070). The second device receiving the Poll packet transmits a data packet to the first device 200 in response to the Poll packet (S6080) and terminates the Bluetooth BR/EDR connection procedure.

Such a procedure is a procedure performed when devices attempt to perform wireless communication through Bluetooth BR/EDR. This procedure has problems in that whether the first device and the second device are devices supporting Bluetooth BR/EDR must be checked in advance and a required service can be used only when Bluetooth BR/EDR must be connected and communication must be performed through Bluetooth BR/EDR.

Accordingly, in order to solve such a problem, the present invention provides a method of checking whether each device supports Bluetooth BR/EDR and can provide which service through Bluetooth LE and connecting Bluetooth BR/EDR.

Figure 7:
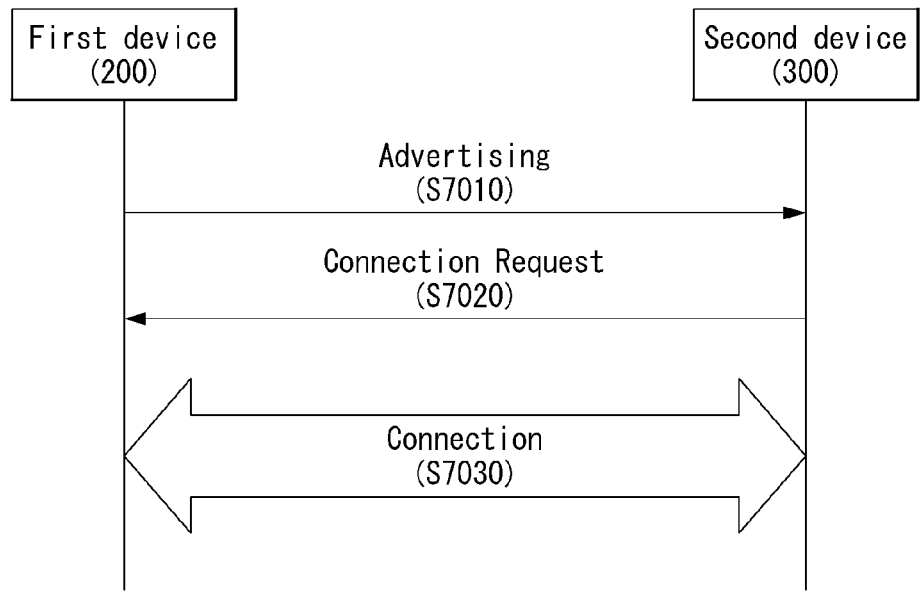
FIG. 7 is a flowchart illustrating a method of establishing a connection using Bluetooth low energy (LE) between devices.

FIG. 7 is a flowchart illustrating a method of establishing a connection using Bluetooth low energy (LE) between devices.

As shown in FIG. 7, for a Bluetooth LE connection between a first device 200 and a second device 300, the first device 200 transmits an advertising message to the second device (S7010).

The advertising message, as described above, is used to provide its own information to another device using Bluetooth LE, and may include a variety of types of information, such as service information provided by a device and user information.

After checking information included in the advertising message transmitted by the first device 200, the second device 300 transmits a connection request message for requesting a Bluetooth LE connection to the first device 200 (S7020). The first device 200 and the second device 300 form a Bluetooth low energy (LE) connection (S7030).

Such a method has disadvantages in that connection formation cannot be controlled and PIN number check and connection establishment control are impossible if a user interface (UI) is not present in the first device 200 and/or the second device 300.

Accordingly, in order to solve the problems, the present invention proposes a method of forming a connection between the first device 200 and the second device 300 using a third device.

Figure 8:
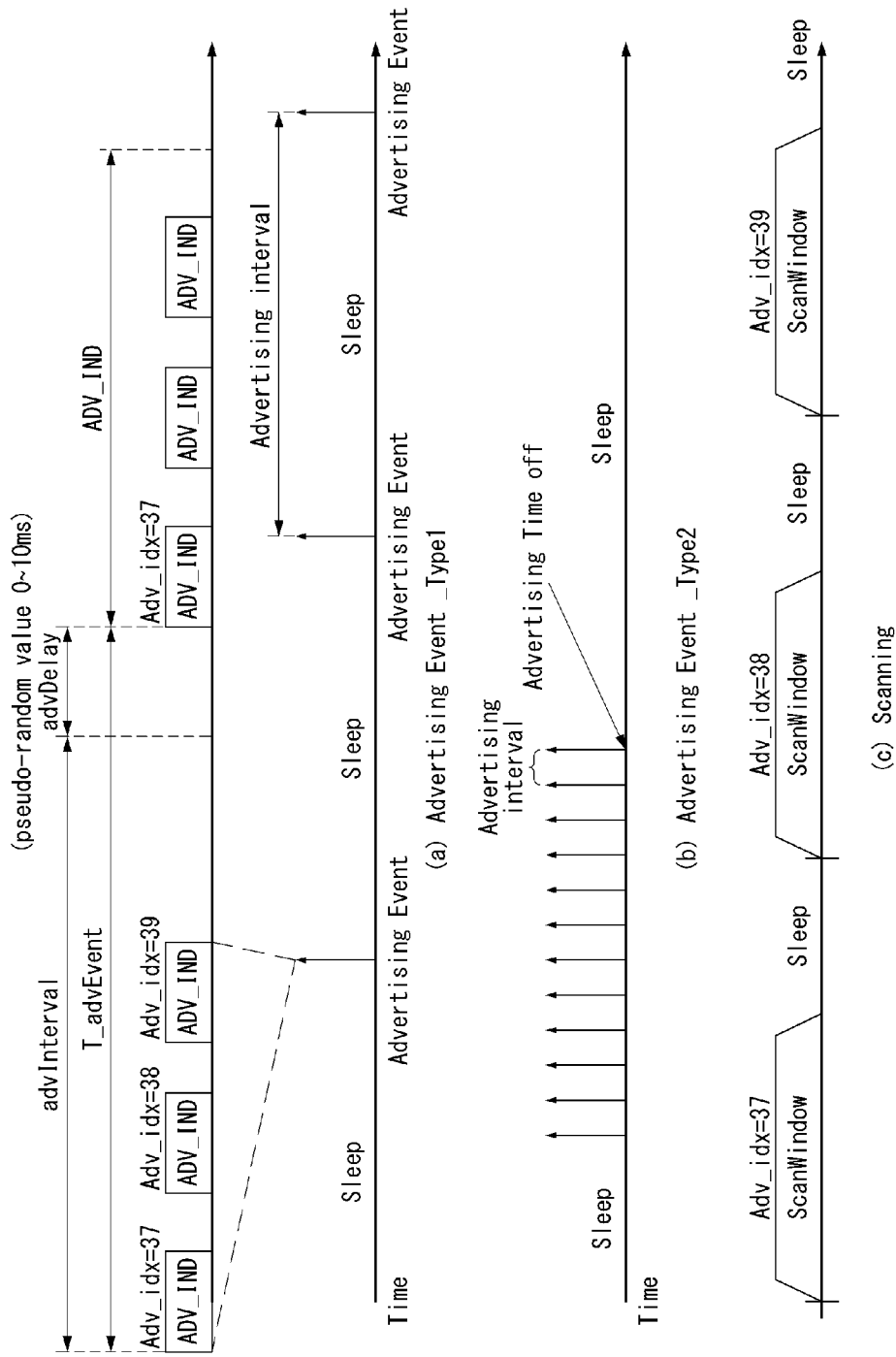

FIGS. 8 and 9 are diagrams showing examples of an advertising event and a scanning event for scanning a device in Bluetooth LE.

Referring to FIGS. 8 and 9, in Bluetooth LE, a server device in an advertising state periodically transmits an advertising message, providing notification of its presence, to surrounding devices.

The server device may repeatedly perform such an advertising event at constant intervals.

In this case, in the advertising event, the server device transmits the advertising message in each of three advertising channels as described above.

The advertising event includes two types, as shown in FIG. 8.

(a) First, the server device may be present in sleep mode during a long advertising interval after one advertising event, and may transmit an advertising message in an advertising event.

(b) Second, the server device may be present in sleep mode after advertising time off since an advertising event at a short advertising interval.

(c) A client device in a scanning state may receive the advertising message transmitted by the server device. In this case, the server device may receive an advertising message transmitted from the surroundings during a scan window period in each advertising channel.

In this case, the (a) and (b) may operate in each procedure depending on whether the advertising time is off or not, as shown in FIG. 9.

Through such a method, the server device can notify surrounding client devices of its presence, and the client device can scan surrounding server devices.

Figure 10:
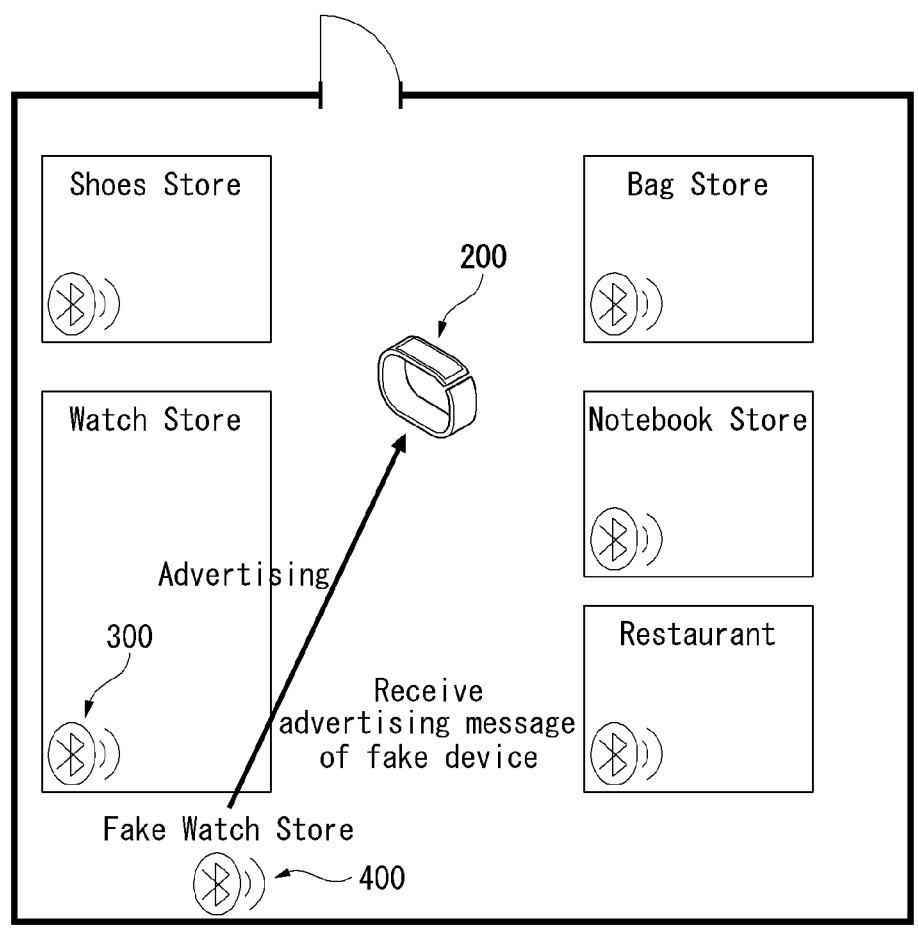
FIGS. 10 and 11 are diagrams showing an example of a method for an external device to imitate another device and to perform a connection.
Figure 11:
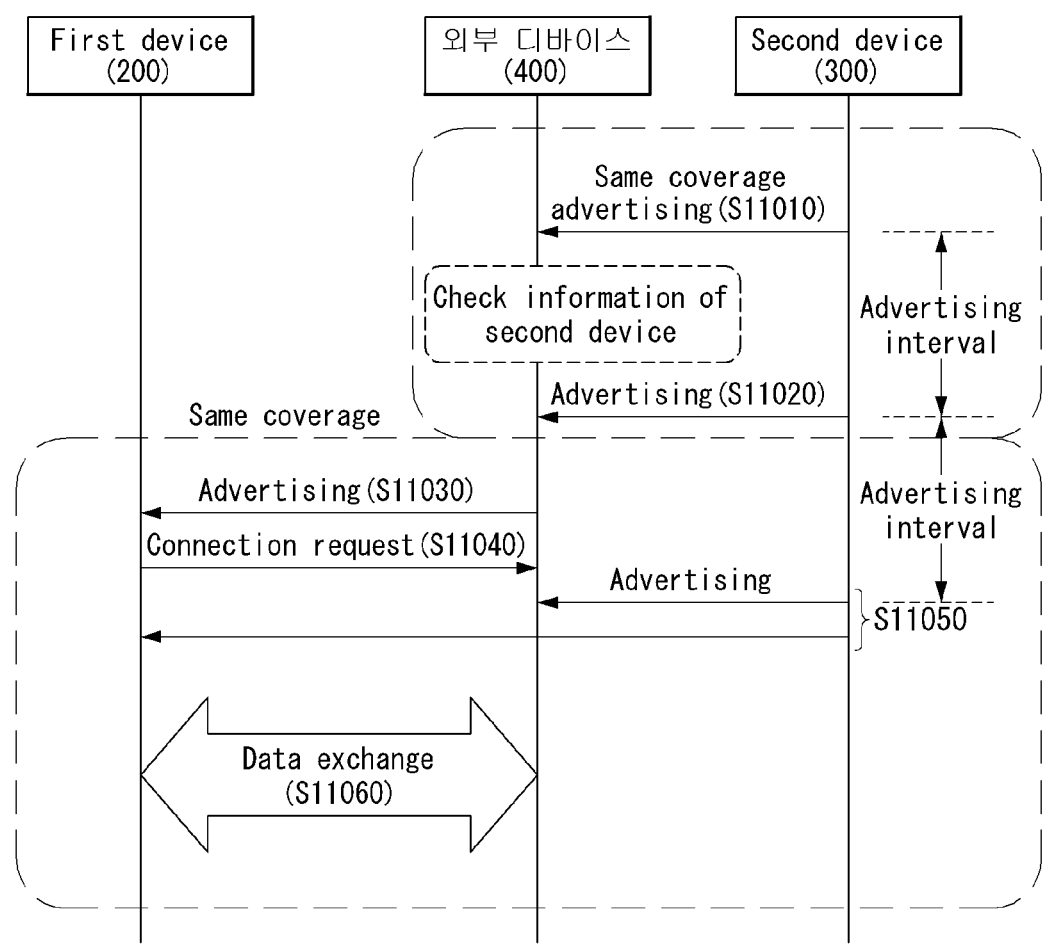

FIGS. 10 and 11 are diagrams showing an example of a method for an external device to imitate another device and to perform a connection.

Referring to FIG. 10, when the first device 200 enters the space in which a plurality of Bluetooth devices is present, an external device 400 may form a Bluetooth LE connection with the first device by transmitting the same advertising message as the advertising message of the second device 300 to the first device 200.

Specifically, as shown in FIG. 11, the second device 300 and the external device 400 are present in the same Bluetooth coverage. In this case, the second device 300 may repeatedly transmit an advertising message at specific advertising intervals as described above (S11010, S11020).

The external device 400 may check information of the second device 300 through the advertising message transmitted by the second device 300.

Thereafter, when the first device 200 moves to the coverage in which the second device 300 and the external device 400 are present, the external device 400 may imitate the second device 300 based on information of the second device 300, and may transmit an advertising message to the first device 200 (S11030).

The first device 200 that has received the advertising message recognizes the external device 400 as the second device 300 and forms a Bluetooth LE connection by transmitting a connection request message to the external device 400 (S11040).

Thereafter, the second device 300 may transmit an advertising message to the first device 200 (S11050). However, since the first device 200 has recognized the external device 400 as the second device 300 and has established the Bluetooth LE connection, it does not respond to the advertising message transmitted by the second device 300 and exchanges erroneous data with the external device 400 (S11060).

If a plurality of Bluetooth devices is present as described above, an advertising message is broadcasted and other devices may easily obtain device information. Accordingly, there is a problem in that a device may perform a connection with an erroneous device.

Furthermore, there is a problem in that the formation of a Bluetooth LE connection between a client device and a server device is delayed if the server device does not transmit an advertising message in the same channel during the scan period of the client device.

Accordingly, in order to solve such a problem, the present invention proposes a method for a server device to notify a client device of the transmission interval of its own advertising message.

Figure 12:
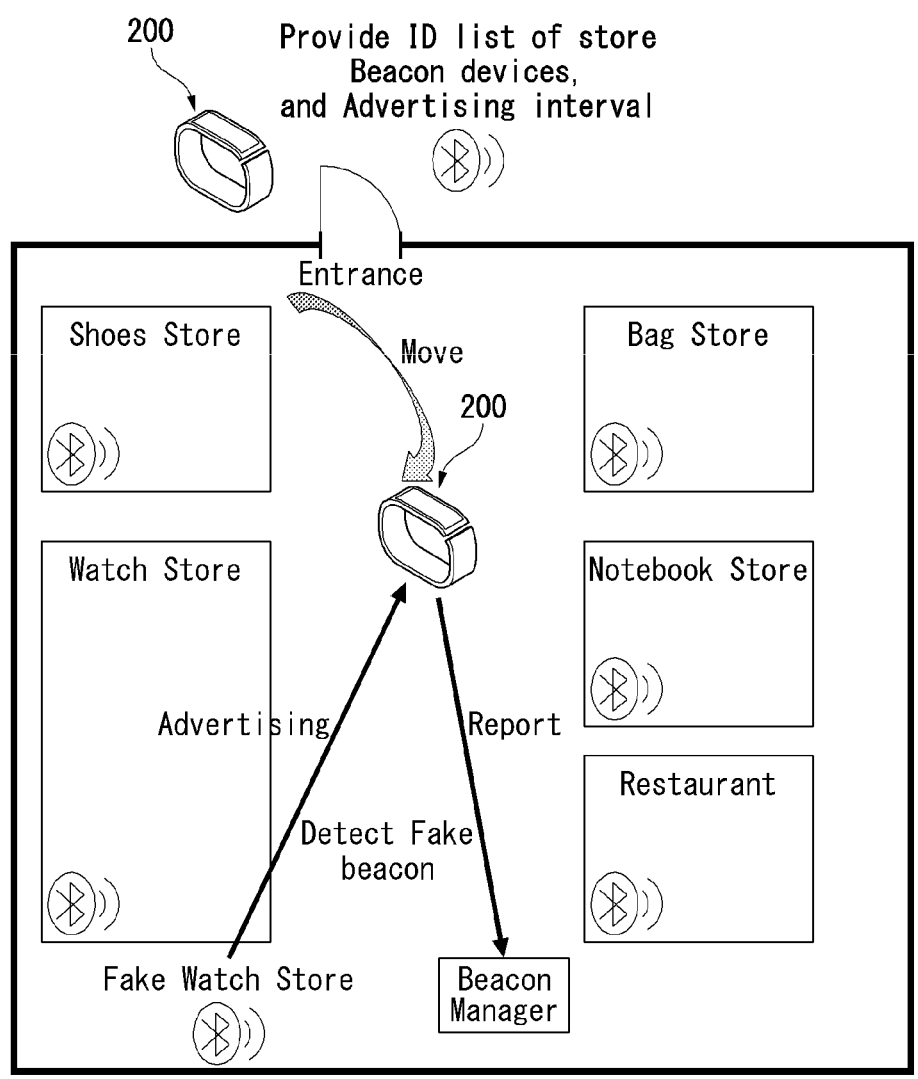
FIG. 12 is a diagram showing an example of a method for an external device to imitate another device and to perform a connection according to an embodiment of the present invention.

FIG. 12 is a diagram showing an example of a method for an external device to imitate another device and to perform a connection according to an embodiment of the present invention.

Referring to FIG. 12, when the first device 200 enters the space in which a plurality of Bluetooth devices is present, it may identify an external device that fakes another device by receiving information capable of identifying each Bluetooth device.

Specifically, when the first device 200 enters the area in which a plurality of Bluetooth devices is present, it may receive identification information capable of identifying a device of the area from a device from which information can be first received, such as a Bluetooth device at the entrance of the area.

In this case, the identification information may include an ID list including the IDs of devices and interval information indicative of the interval in which each device transmits an advertising message.

Thereafter, when the first device 200 moves to the area and receives an advertising message (e.g., fake beacon) that fakes a specific device from an external device that fakes another device, the first device 200 may recognize that the external device fakes the specific device through the identification information.

After recognizing that the external device fakes the specific device, the first device 200 may report such a fact to a beacon manager. The beacon manager can prevent the connection of the external device by transmitting the fact to a Bluetooth device within the area.

Through such a method, an external device can be prevented from transmitting and receiving erroneous data by faking a specific device and performing a connection.

Figure 13:
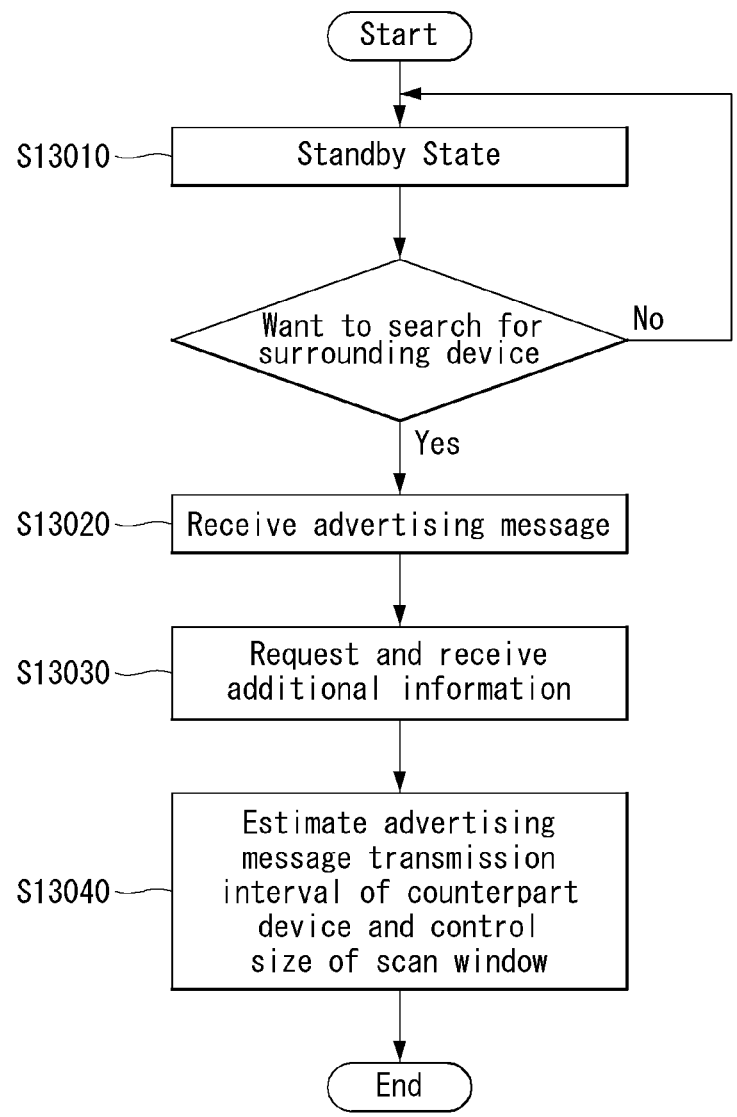
FIGS. 13 and 14 are flowcharts showing examples of a method for connecting devices by controlling a scanning time according to an embodiment of the present invention.
Figure 14:
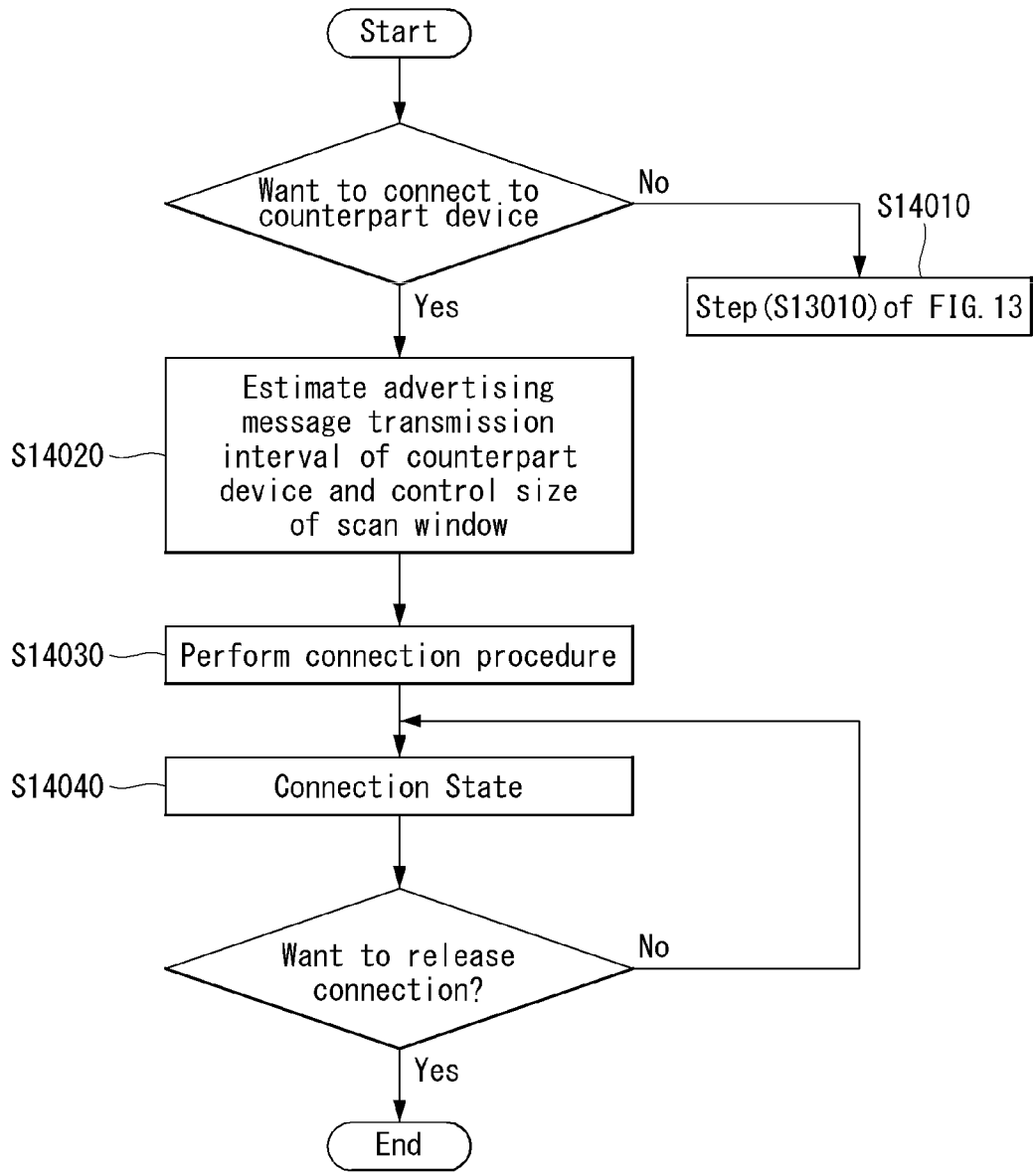

FIGS. 13 and 14 are flowcharts showing examples of a method for connecting devices by controlling a scanning time according to an embodiment of the present invention.

Referring to FIGS. 13 and 14, a Bluetooth device can prevent an external device from faking a specific device through the interval in which an advertising message is transmitted.

Specifically, the first device 200 is initially present in a standby state (S13010). In the standby state, the first device 200 cannot transmit or receive a message.

Furthermore, in the standby state, the first device 200 may enter an advertising state, a scanning state or an initiating state.

If the first device 200 attempts to search for a surrounding device supporting Bluetooth in the standby state, it enters the scanning state and receives an advertising message transmitted by a surrounding device (S13020).

In this case, the advertising message may include transmission interval information indicative of the advertising message transmission interval of the surrounding device.

If the transmission interval information is not included in the advertising message, the first device 200 requests additional information by transmitting a scan request message to the retrieved device.

Thereafter, the first device 200 receives a scan response message, including the additional information, from the retrieved device (S13030). In this case, the additional information may include the transmission interval information.

The first device may estimate the period or interval in which the retrieved device transmits an advertising message based on the transmission interval information, and may control the size of a scan window based on the estimated period or interval.

In this case, the scan window refers to a period in which a Bluetooth device receives a message transmitted by surrounding devices.

For example, the first device 200 may control or reduce the size of the scan window further largely in order to receive an advertising message transmitted by the retrieved device based on the estimated period or interval.

That is, if the scan window is small to receive the advertising message transmitted by the retrieved device, the scan window may be controlled so that it becomes larger. If the scan window is too large to receive the advertising message transmitted by the retrieved device, the scan window may be controlled so that it become smaller so that a Bluetooth LE connection can be performed rapidly and efficiently.

Alternatively, the size of the scan window may be controlled so that the advertising message transmitted by the retrieved device can be received twice in order to identify an external device that fakes the retrieved device within a transmission period when the external device transmits an advertising message.

Through such a method, the first device 200 can scan surrounding other devices supporting Bluetooth.

FIG. 14 shows an example of a method of performing a connection procedure with the device retrieved through the method of FIG. 13.

If the first device 200 does not connect to the device retrieved through the procedure of FIG. 13, it may enter the standby state again as in step S13010 of FIG. 13 (S14010).

However, if the first device 200 wants to connect to the retrieved device, the first device 200 estimates a transmission interval again in order to receive the advertising message transmitted by the retrieved device, and controls the size of the scan window (S14020).

In this case, the first device 200 has to transmit a connection request message to the retrieved device in order to perform the connection with the retrieved device. The reason for this is that the connection request message can be transmitted after a specific time since the advertising message is received.

The first device 200 that has received an additional advertising message from the retrieved device may perform a connection procedure by transmitting a connection request message to the retrieved device (S14030).

Thereafter, the first device 200 and the retrieved device enter the connection state and may transmit and receive data (S14040).

If the first device 200 wants to release the connection with the retrieved device, it may perform a connection release procedure. The first device 200 becomes the standby state again.

Through such a method, the first device 200 can be rapidly connected to a surrounding device, and can identify an external device that fakes a specific device.

Figure 15:
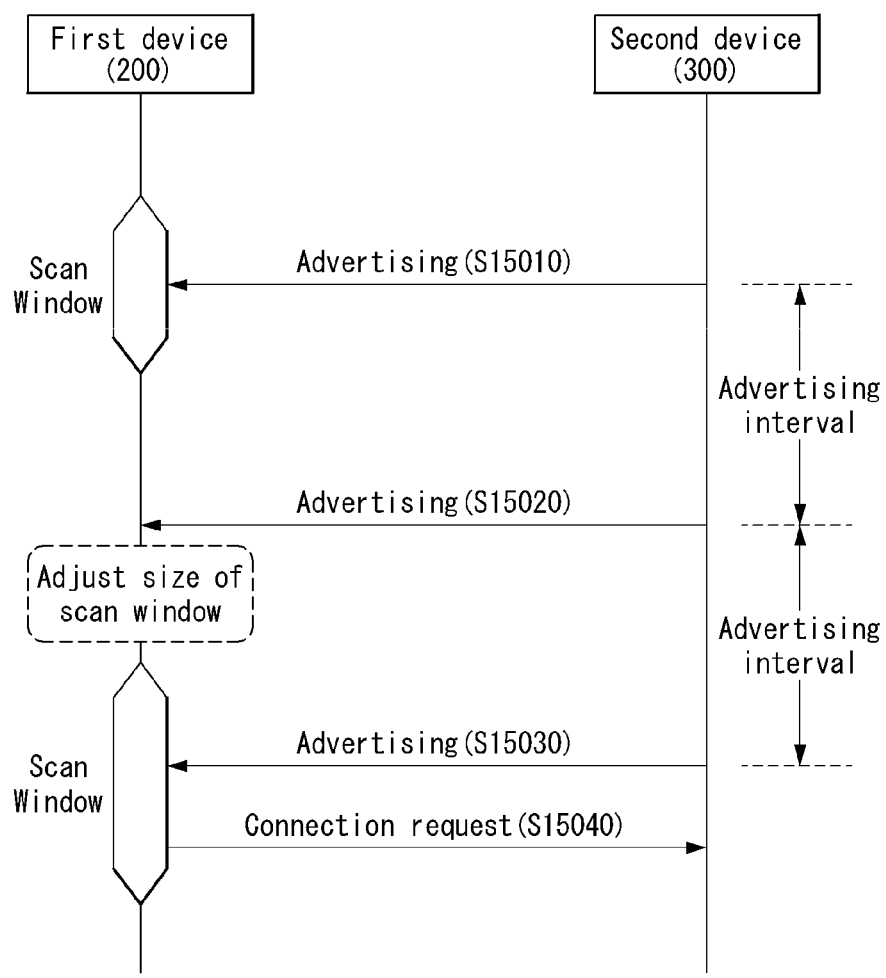
FIG. 15 is a flowchart showing an example of a method for connecting devices by controlling a scanning time according to an embodiment of the present invention.

FIG. 15 is a flowchart showing an example of a method for connecting devices by controlling a scanning time according to an embodiment of the present invention.

Referring to FIG. 15, a Bluetooth device may efficiently perform a Bluetooth connection by controlling the size of a scan window for scanning a surrounding device.

Specifically, the first device 200 may enter the scanning state in order to scan surrounding devices, and may receive an advertising message transmitted by the second device 300 during a scan window period in the scanning state (S15010).

The advertising message may be transmitted through an advertising channel and may be broadcasted using an advertising interval as a period.

In this case, the advertising message may include transmission interval information related to the advertising interval indicative of the period or interval in which the second device 300 transmits the advertising message.

The expression of the advertising message is one example and may be called various expressions, such as an advertising message, an advertisement PDU and an advertisement packet.

The first device 200 cannot receive an advertising message although the advertising message is transmitted by the second device 300 other than a scan window period (S15020).

Accordingly, the first device 200 may control the size of a scan window by estimating the period or interval in which the second device transmits the advertising message based on the transmission interval information.

The first device 200 may receive the advertising message transmitted by the second device 300 through the scan window period whose size has been controlled (S15030), and may form a Bluetooth LE connection with the second device 300 by transmitting a connection request message to the second device 300 based on the advertising message (S15040).

Through such a method, the first device 200 can estimate when an advertising message is transmitted by the second device 300, and can rapidly form a Bluetooth LE connection with the second device 300 by controlling the size of a scan window.

Figure 16:
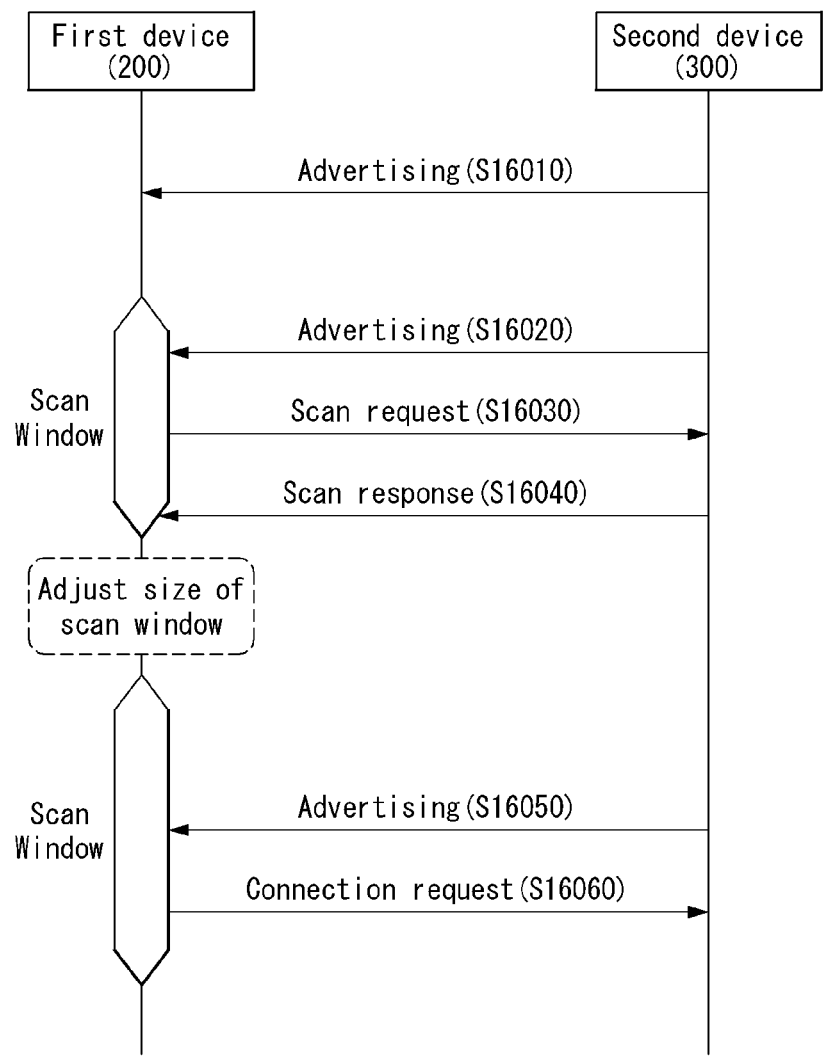
FIG. 16 is a flowchart showing another example of a method for connecting devices by controlling a scanning time according to an embodiment of the present invention.

FIG. 16 is a flowchart showing another example of a method for connecting devices by controlling a scanning time according to an embodiment of the present invention.

FIG. 16 is a case where the first device 200 requires additional information. The first device 200 may obtain additional information from the second device 300 by requesting the additional information from the second device 300.

Specifically, the first device 200 may enter the scanning state in order to scan surrounding devices.

However, if it is not a scan window period, the first device 200 cannot receive an advertising message transmitted by the second device 300 (S16010).

Thereafter, in the scanning state, the first device 200 may receive the advertising message transmitted by the second device 300 during a scan window period (S16020).

The advertising message may be transmitted through an advertising channel and may be broadcasted using an advertising interval as a period.

The expression of the advertising message is one example, and may be called various expressions, such as an advertising message, an advertisement PDU and an advertisement packet.

If the first device 200 has not receive transmission interval information related to the advertising interval indicative of the period or interval in which the second device 300 transmits the advertising message through the advertising message, it transmits a scan request message that requests additional information to the second device 300 (S16030).

Thereafter, the first device 200 may receive a scan response message, including the additional information, from the second device 300 (S16040).

In this case, the additional information may include transmission interval information.

The first device 200 may control the size of a scan window by estimating the period or interval in which the second device transmits the advertising message based on the transmission interval information.

The first device 200 may receive the advertising message transmitted by the second device 300 through the scan window period whose size has been controlled (S16050), and may form a Bluetooth LE connection with the second device 300 by transmitting a connection request message to the second device 300 based on the advertising message (S16060).

Figure 17:
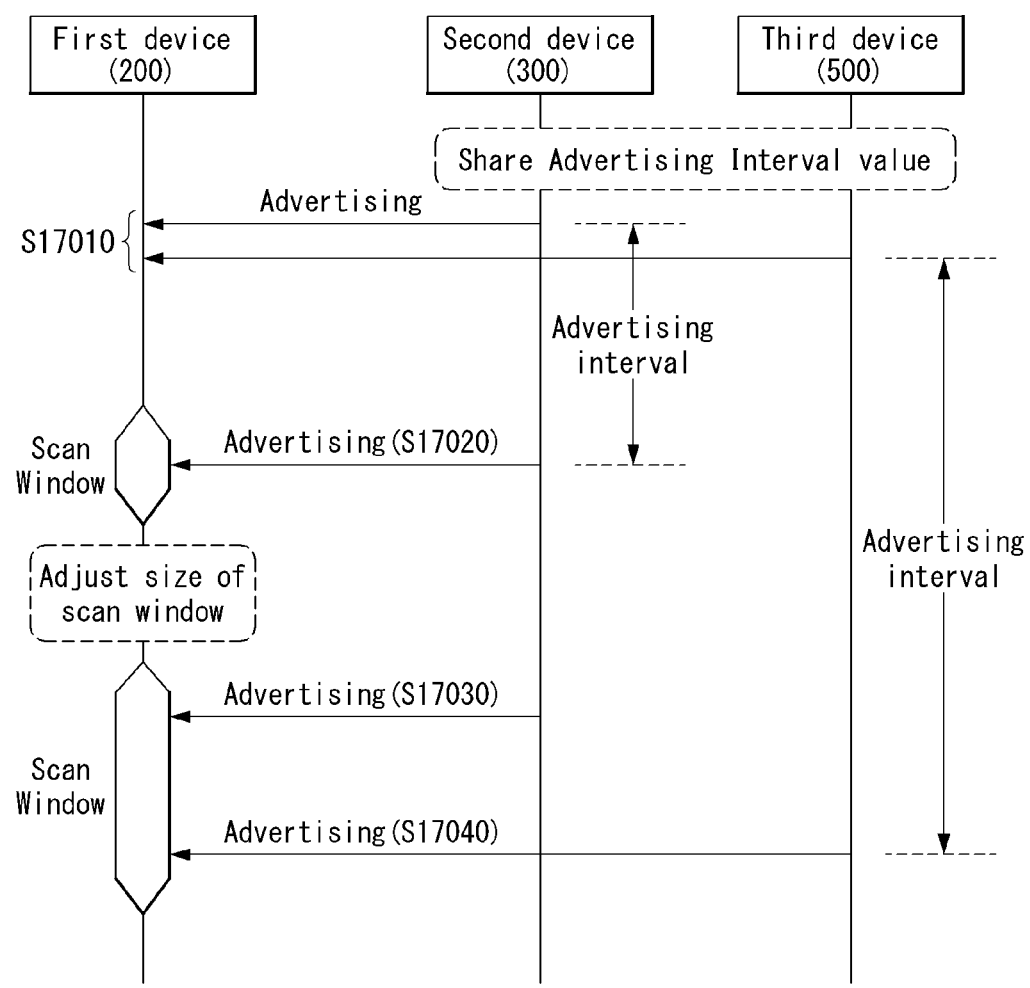
FIG. 17 is a flowchart showing yet another example of a method for connecting devices by controlling a scanning time according to an embodiment of the present invention.

FIG. 17 is a flowchart showing yet another example of a method for connecting devices by controlling a scanning time according to an embodiment of the present invention.

Referring to FIG. 17, surrounding devices (the second device and the third device) of the first device 200 may share transmission interval information indicative of the transmission intervals (or periods) of their advertising messages, and may rapidly form a Bluetooth LE connection by transmitting the shared information to the first device 200.

It is first assumed that the second device 300 and the third device 500 are sharing transmission interval information related to advertising intervals indicative of their advertising message transmission intervals (or periods).

The first device 200 may enter the scanning state in order to scan surrounding devices.

However, if it is not a scan window period, the first device 200 cannot receive an advertising message transmitted by the second device 300 and/or the third device 500 (S17010).

Thereafter, the first device 200 may receive an advertising message transmitted by the second device 300 during a scan window period in the scanning state (S17020).

The advertising message transmitted by the second device 300 and/or the third device 500 may be transmitted through an advertising channel, and may be broadcasted using an advertising interval as a period.

In this case, the advertising message may include transmission interval information (first transmission interval information) related to the advertising interval indicative of the period or interval in which the second device 300 transmits the advertising message and transmission interval information (second transmission interval information) related to the advertising interval indicative of the period or interval in which the third device 500 transmits the advertising message.

The first device 200 may control the size of a scan window by estimating the period or interval in which the second device and the third device 500 transmit the advertising messages based on the transmission interval information.

In this case, the size of the scan window may be controlled based on the first transmission interval information if the first device 200 attempts to receive only the advertising message of the second device 300, and may be controlled based on the second transmission interval information if the first device 200 attempts to receive only the advertising message of the third device 500.

Furthermore, if the first device 200 attempts to receive the advertising messages of the second device 300 and the third device 500, the size of the scan window may be controlled based on the first transmission interval information and the second transmission interval information.

The first device 200 may receive the advertising messages transmitted by the second device 300 and the third device 500 through the scan window period whose size has been controlled (S17030, S17040).

Thereafter, the first device may form a Bluetooth LE connection with the second device 300 by transmitting a connection request message to the second device 300 and/or the third device 500 based on the advertising messages transmitted by the second device 300 and the third device 500.

As described above, devices share transmission interval (or period) information of their advertising messages and transmit the shared information to the first device 200, thereby being capable of performing a Bluetooth LE connection rapidly and efficiently.

Figure 18:
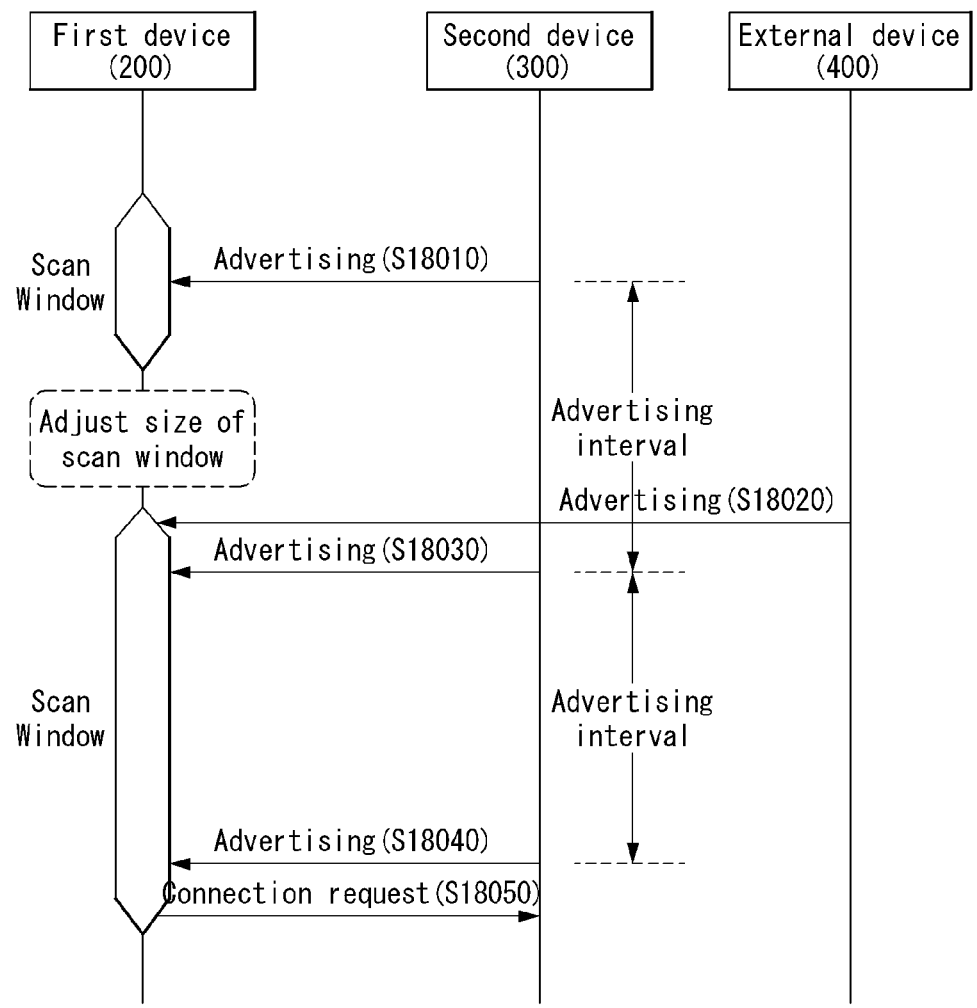
FIG. 18 is a flowchart showing yet another example of a method for connecting devices by controlling a scanning time according to an embodiment of the present invention.

FIG. 18 is a flowchart showing yet another example of a method for connecting devices by controlling a scanning time according to an embodiment of the present invention.

Referring to FIG. 18, the first device 200 may determine whether an advertising message transmitted through the advertising message transmission interval (or period) of the second device 300 is an advertising message transmitted by an external device that has faked the second device, and can prevent a connection with an external device based on the determination.

Specifically, the first device 200 may enter the scanning state in order to scan surrounding devices, and may receive an advertising message (first advertising message) transmitted by the second device 300 during a scan window period in the scanning state (S18010).

The advertising message may be transmitted through an advertising channel, and may be broadcasted using an advertising interval as a period.

In this case, the advertising message may include transmission interval information related to the advertising interval indicative of the period or interval in which the second device 300 transmits the advertising message.

The expression of the advertising message is one example may be called various expressions, such as an advertising message, an advertisement PDU and an advertisement packet.

The first device 200 may control the size of a scan window by estimating the period or interval in which the second device transmits the advertising message based on the transmission interval information.

In this case, the first device 200 may control the size of the scan window so that the advertising message transmitted by the second device 300 is received by a specific number.

Thereafter, the first device may receive an advertising message (second advertising message) from the external device 300 during the scan window period (S18020).

In this case, as described in FIG. 11, the external device 500 may obtain information of the second device, and may transmit an advertising message identical with the advertising message transmitted by the second device 300 to the first device 200.

That is, the external device 300 may fake the second device 300 and transmit the advertising message to the first device 200.

If the first device 200 receives the advertising message from the external device 300, it may determine whether the advertising message has been transmitted by the second device 300 based on the transmission interval information obtained through step S18010.

That is, the first device 200 may determine whether the second advertising message has been transmitted by the second device 300 or an external device by determining whether the second advertising message has been transmitted before or after the transmission interval indicated by the transmission interval information.

If it is determined that the second advertising message has been transmitted by the external device 300, the first device 200 may discard the second advertising message and report this to a specific device.

Furthermore, if the external device 300 transmits the second advertising message simultaneously with the second device 300, the first device 200 receives the same two advertising messages and may discard them.

That is, if a point of time at which the second advertising message is transmitted by the external device 300 and a point of time at which the advertising message (third advertising message) is transmitted by the second device 300 are the same, the first device 200 may discard both the second advertising message and the third advertising message.

Thereafter, when the first device 200 receives another advertising message (fourth advertising message) from the second device 300 after the transmission interval, it may form a Bluetooth LE connection with the second device 300 by transmitting a connection request message to the second device 300 based on the fourth advertising message (S18050).

Through such a method, the first device can identify an advertising message transmitted by an external device that fakes the second device.

Figure 19:
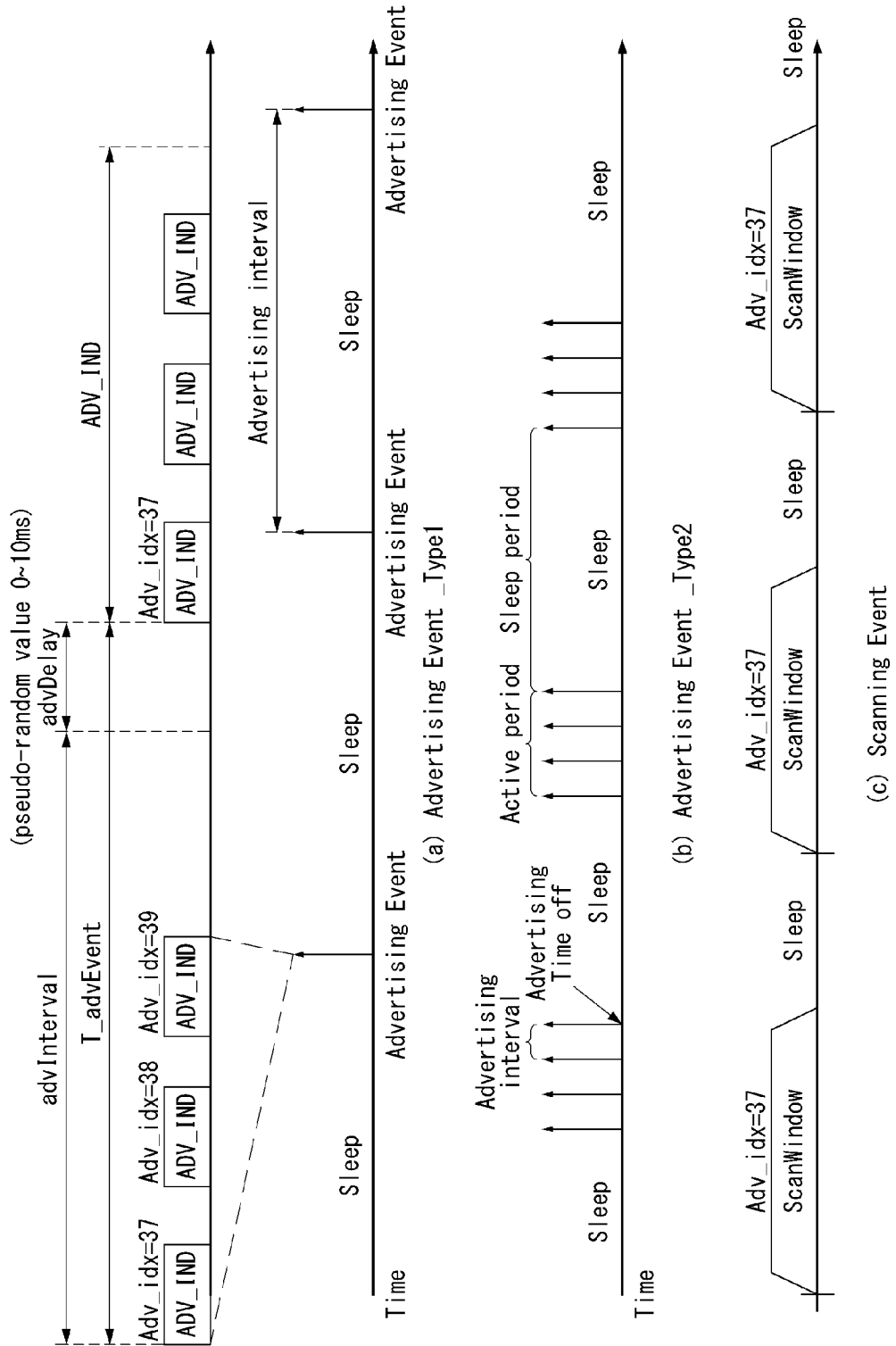
FIG. 19 is a flowchart showing yet another example of a method of setting the period in which a message for the scanning of a device is transmitted and performing a connection according to an embodiment of the present invention.

FIG. 19 is a flowchart showing yet another example of a method of setting the period in which a message for the scanning of a device is transmitted and performing a connection according to an embodiment of the present invention.

FIGS. 19(a) and 19(b) are the same as FIGS. 8(a) and 8(c).

However, referring to FIG. 19(b), a device may have an active period and a sleep period in the advertising state.

Specifically, a server device transmits an advertising message to a surrounding device through an advertising channel during the active period of the advertising state, and does not transmit an advertising message in the sleep period.

The server device may transmit information of the active period and the sleep period to a surrounding device through the advertising message. The client devices that have received the information may obtain setting information of the active period and sleep period of the server device.

The client devices that have received the setting information may control the size of a scan window based on the active period in order to receive the advertising message transmitted by the server device, and may rapidly form a Bluetooth LE connection through the scan window whose size has been controlled.

Figure 20:
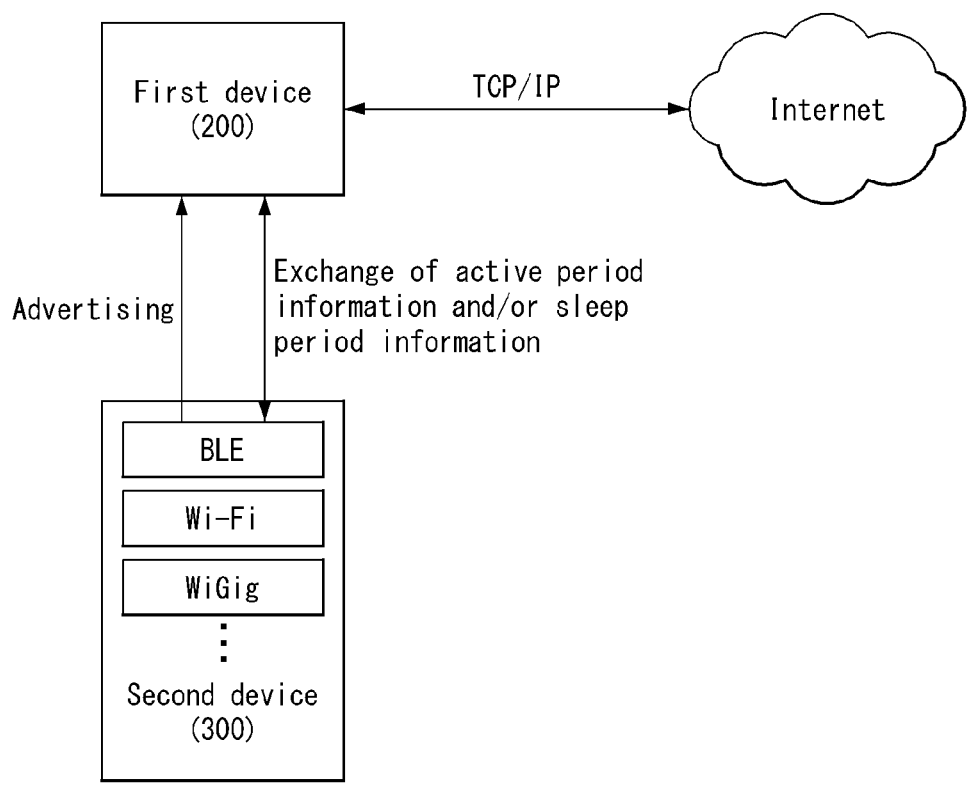
FIGS. 20 and 21 are diagrams showing an example of a method of setting the period in which a message for the scanning of a device is transmitted according to an embodiment of the present invention.
Figure 21:
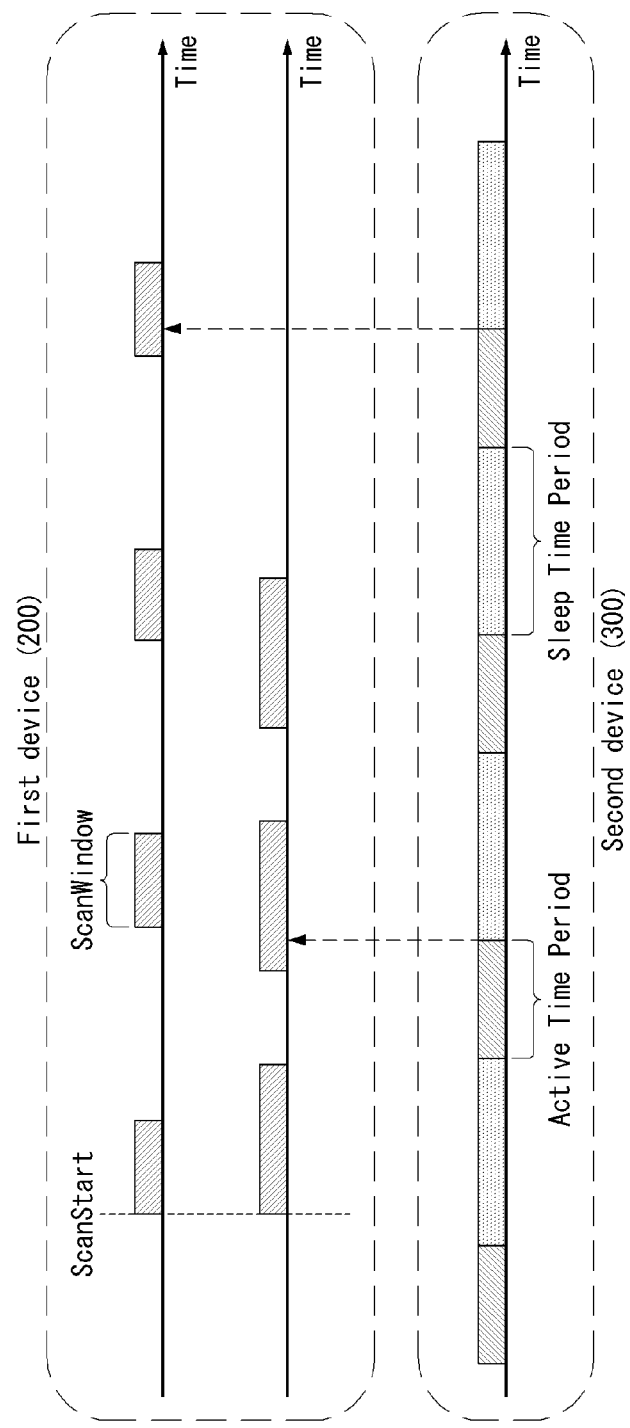

FIGS. 20 and 21 are diagrams showing an example of a method of setting the period in which a message for the scanning of a device is transmitted according to an embodiment of the present invention.

Referring to FIGS. 20 and 21, a device may control a scan window through the setting of the active period and the sleep period described in FIG. 19, and may rapidly form a Bluetooth LE connection through the controlled scan window.

Specifically, as shown in FIGS. 20 and 21, a second device 300, that is, a server device, may set the active period in which an advertising message is transmitted and the sleep period which an advertising message is not transmitted in the advertising state.

The second device 300 may include a plurality of network interfaces (e.g., Wi-Fi and WiGig) in addition to Bluetooth LE.

The second device 300 may transmit the set sleep period information and active period information to a first device 200, that is, a client device, through an advertising message.

Furthermore, the advertising message may include information of a network interface supported by the second device 300.

The first device 200 may control the size of a scan window based on the sleep period information and the active period information, and then may receive an advertising message transmitted by the second device 300 in the active period during a scan window period.

The first device 200 may scan the second device 300 through the scan window whose size has been controlled, and may form a Bluetooth LE connection by transmitting a connection request message to the second device 300.

The time taken to scan a device can be reduced by setting the period in which an advertising message is transmitted and the period in which an advertising message is not transmitted and notifying surrounding devices of the set periods as described above.

Figure 22:
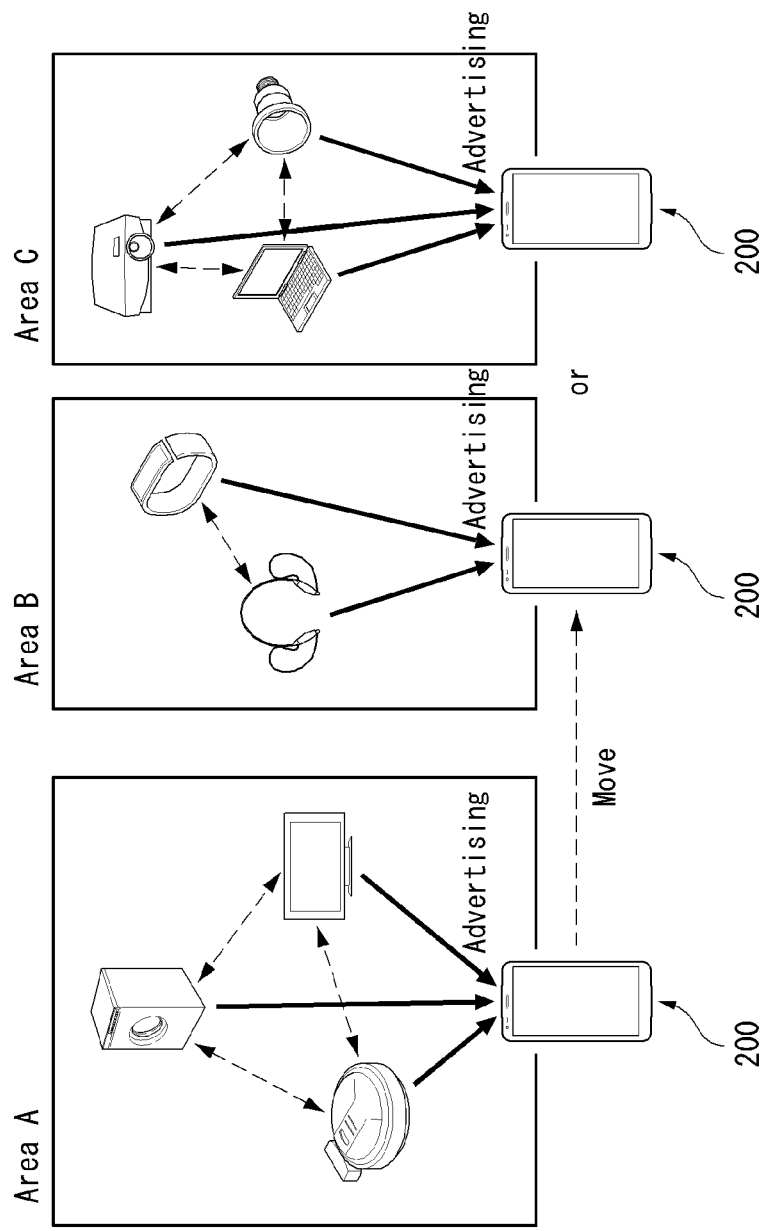
FIG. 22 is a diagram showing an example of a method of scanning a device according to a movement of a device according to an embodiment of the present invention.

FIG. 22 is a diagram showing an example of a method of scanning a device according to a movement of a device according to an embodiment of the present invention.

Referring to FIG. 22, devices present in the same Bluetooth area may share their advertising message transmission intervals (or periods), may receive the shared information, and may form a Bluetooth LE connection by the size of a scan window.

Specifically, devices present in an area A, an area B and an area C are sharing the transmission intervals (or periods) of advertising messages for a device scan through the transmission and reception of advertising messages in a connectionless state or the transmission and reception of specific messages in a connection state.

When the first device 200 moves to the area A and is in the scanning state for scanning a surrounding device, the first device 200 may receive an advertising message from at least one of devices present in the area A.

In this case, the advertising message may include transmission interval information indicative of the shared transmission interval (or period).

The first device 200 may estimate the advertising message transmission intervals (or periods) of the devices present in the area A through the received advertising message, and may control the size of a scan window based on the estimated transmission intervals (or periods).

The first device 200 may receive the advertising message of the devices present in the area A through the controlled scan window, and may scan the devices present in the area A.

If the first device 200 moves from the area A to the area B or the area C, the first device 200 may scan devices present in the area B or the area C using the same method as that in the area A.

Figure 23:
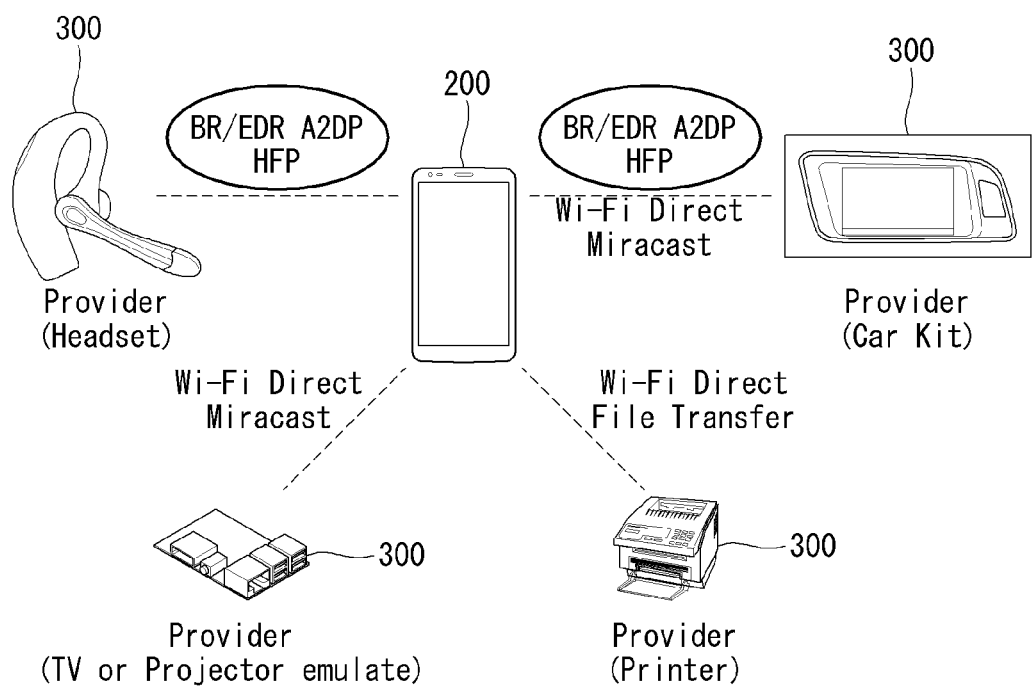
FIG. 23 is a diagram briefly showing an example of a method of connecting to substitution communication means through Bluetooth LE according to an embodiment of the present invention.

FIG. 23 is a diagram briefly showing an example of a method of connecting to substitution communication means through Bluetooth LE according to an embodiment of the present invention.

Referring to FIG. 23, the first device 200 may obtain information of substitution communication means (e.g., Bluetooth BR/EDR, Wi-Fi or Wi-Fi Direct) provided by the second device 300 through Bluetooth LE and information of a service (e.g., Bluetooth BR/EDR A2DP HFP, Wi-Fi Direct Miracast or Wi-Fi Direct File Transfer) which may be provided through the substitution communication means.

The first device 200 may be connected to the second device 300 through the substitution communication means based on the obtained information, and may provide various services through the connected substitution communication means.

FIGS. 24 to 27 are diagrams showing a method for obtaining information of substitution communication means through Bluetooth LE and examples of a data format according to embodiments of the present invention.

Referring to FIGS. 24 to 27, the first device 200 and the second device 300 may exchange substitution communication means information supported by each device and service information which may be provided through the substitution communication means in a connection procedure of Bluetooth LE.

Figure 24:
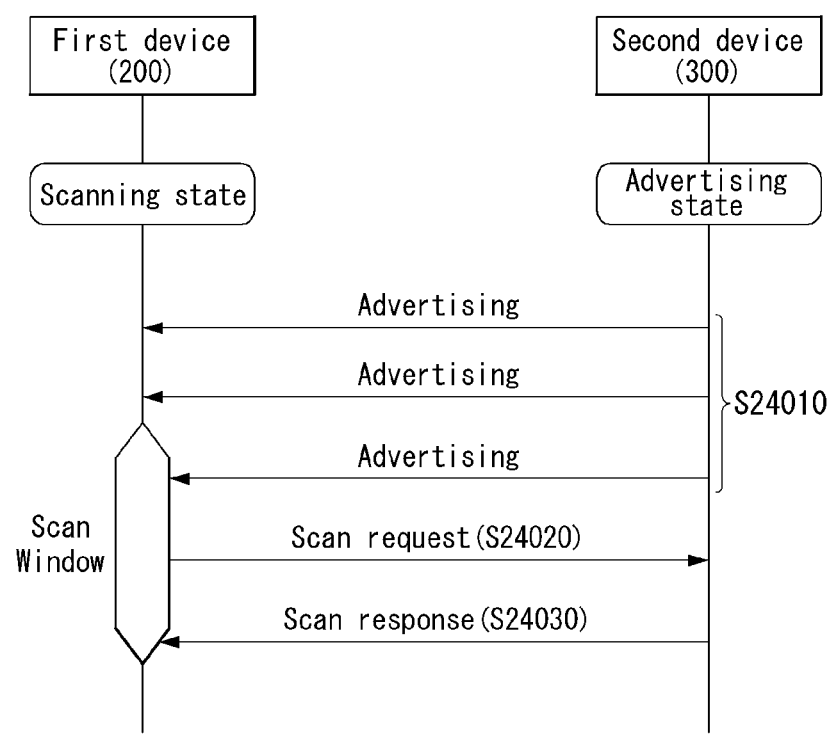

Specifically, as shown in FIG. 24, the first device 200 is present in the scanning state for scanning a surrounding device supporting Bluetooth, and the second device 300 is present in the advertising state.

The second device 300 transmits an advertising message to the first device 200 in the advertising state (S24010). In this case, the advertising message, as described above, may be transmitted to a plurality of devices in a broadcast manner through an advertising channel.

The first device 200 may receive an advertising message during a scan window period in the scanning state.

In this case, the advertising message may include substitution communication means information indicative of information of substitution communication means supported by the second device 300 and service information indicative of information of a service which may be provided through the substitution communication means.

The service information may be included as list information in which a plurality of services has been listed. The substitution communication means information and the service information may become basic information on which the first device 200 subsequently selects substitution communication means and a service which will be activated through the GATT of Bluetooth LE.

Table 2 below shows an example of a data format of the advertising message.

TABLE 2

| Service Discovery | Organization Frame | | | |
|---|---|---|---|---|
| Data AD Type Code | Organization ID | SDS Flags | Length | Organization Data |
| Byte Order | N/A | N/A | N/A | N/A | LSO ... MSO |
| Data Type | Unit8 | Unit8 | 8 bits | Unit8 | Variable |
| Size | 1 octet | 1 octet | 1 octet | 1 octet | 0-25 octets |

Hereinafter, the data format of the advertising message is described in detail below through FIGS. 25 and 26.

FIGS. 25 and 26 show examples of the data formats of the advertising message. In FIG. 25, an AD Type field indicates a service to be provided by the second device 300 through Bluetooth LE.

In the present invention, the AD Type of FIG. 11 may have values, such as Table 3.

TABLE 3

| Type Value | Data Type Name |
|---|---|
| 0x01 | <<Flag>> |
| 0x09 | <<Complete Local Name>> |
| 0x0D | <<Class of Device>> |
| 0x2A(TBD) | <<Service Discovery Data>> |

FIG. 25 shows a data format if the AD Type has been set to 0x2 A, and FIG. 26 shows a data format if the AD Type has been set to 0x01.

FIG. 26(b) shows setting for Random Address Setting.

AD Data of FIGS. 25 and 26 includes data for handover, and may include an Organization ID field, an SDS Flags field, a Length field and an Organization Data field.

The Organization ID field is a field including the Organization ID of substitution communication means. The SDS Flags field may include the role of a device, state information of the device, whether additional data is present in a GATT Database, and state information of substitution communication means.

The Organization Data field may include a service field, including service information related to a service (Profile information in the case of Bluetooth BR/EDR) which may be provided through the substitution communication means, and a Time field including an offset value related to the time until the substitution communication means becomes On or available and/or the time left until a service is available. In this case, the service information may be indicated as a service sequence that is chiefly used.

The service field may consist of a bit format or a Length Type Value (LTV) structure. If the service field consists of the LTV structure, the service field may include list information of services of substitution communication means supported by a device and information for a connection. In this case, the list information may be expressed in a 16-bit UUID form.

Table 4 below is a table showing an example of the LTV structure of the service field.

TABLE 4

| | Length | Type | UUID |
|---|---|---|---|
| Octet Order | N/A | N/A | LSO ... MSO |
| Data Type | unit8 | Unit8 | List of <<UUID>> |
| Size | 1 octet | 1 octet | 2 octets for each UUID listed |

If a plurality of service UUIDs has been listed in the service field, priority may be assigned to the services. For example, a service UUID close to the Least Significant Octet (LSO) may have high priority, and a service QUID close to the Most Significant Octet (MSO) may have low priority.

The time field may consist of an LTV structure. The first device may determine when the substitution communication means and/or service of the second device are available through an offset value included in the time field.

Table 5 below is a table showing an example of the LTV structure of the time field.

TABLE 5

| | Length | Type | Offset |
|---|---|---|---|
| Octet Order | N/A | N/A | N/A |
| Data Type | unit8 | uni8 | unit8 |
| Size | 1 octet | 1 octet | 1 octet |

In the offset value, time may be indicated by sec, clock tic or another method. If the time is indicated by sec, when the time gradually decreases and indicates 0 second, the substitution communication means and/or service of the second device can be used.

The Type fields of the service field and the time field are for distinguishing between the service field and the time field, and may have values, such as Table 6 below.

Table 6 is a table showing an example of the Type values of the service field and the time field.

TABLE 6

| Value | Type |
|---|---|
| 0x00 | Reserved for Future Use |
| 0x01 | UUID |
| 0x02 | Offset |
| 0x03~0xFF | Reserved for Future Use |

If the first device 200 that has obtained the substitution communication means information supported by the second device 300 and the service information capable of being provided through the substitution communication means through the advertising message requires additional information, the first device 200 may transmit a scan request message to the second device 300 (S24020).

Thereafter, the first device 200 may receive a scan response message, including the additional information, from the second device 300 (S24030).

The additional information may include the local name, device class, device type and/or major service lasses of the second device.

FIG. 27 shows an example of the additional information included in the scan response message. FIG. 27(a) shows an example of the local name of a device, and FIG. 27(b) shows an example of a device type.

As described above, the first device 200 may obtain substitution communication means and service information which may be provided through the substitution communication means from the second device through a Bluetooth LE connection procedure.

FIGS. 28 to 31 are diagrams showing a method for handover to substitution communication means through Bluetooth LE and examples of a data format according to embodiments of the present invention.

Referring to FIGS. 28 to 31, the first device 200 may obtain information of a network interface supported by the second device 300 through the method described in FIGS. 24 to 27, and may perform handover from Bluetooth LE to Bluetooth BR/EDR.

Specifically, the first device 200 may obtain information of a network interface supported by the second device 300 through the method described in FIGS. 24 to 27, and then may form a Bluetooth LE connection by transmitting a connection request message to the second device 300.

Thereafter, the first device 200 and the second device 300 may enter the connection state.

If the Bit3 of the SDS Flags field of the advertising message of FIG. 10 is '1' or the first device 200 requires additional information, the first device may make a read request for an additional information request from the second device (S28010).

The read request is a message for requesting information stored in the GATT Database of the second device 300.

FIG. 29 shows an example of services and Characteristics stored in the GATT Database of the second device 300.

FIG. 29(*a*) shows service classes for a Bluetooth BR/EDR connection through Bluetooth LE, and FIG. 29(*b*) shows characteristics for providing the services of FIG. 29(*a*).

FIGS. 30 and 31 show examples of the message formats of a server and client for transmitting and receiving information stored in their GATT Databases.

The first device 200 may receive the requested additional information from the second device 300 through a read response as a response to the read request (S28020).

Thereafter, the first device 200 may transmit a write request message to the second device 300 in order to request the ON of Bluetooth BR/EDR, that is, a substitution communication technology to be connected, and the activation of a service (S28030).

The write request is for requesting the writing of the Handover Control Point characteristic of the GATT Database of the second device 300. In this case, the first device 200 may request the activation of some or all of services supportable by the second device 300 through the write request.

The second device 300 that has received the write request message may enter the BR/EDR page scan state described in FIG. 6.

The second device 300 may receive a write response as a response to the write request (S28040).

The second device 300 activates the ON of Bluetooth BR/EDR, that is, a substitution communication means, and the service in response to the request from the first device 200. In this case, the second device 300 may activate only some or all of services requested by the first device 200.

The first device 200 that has received the write response message may enter the BR/EDR page state described in FIG. 6, may transmit a page message to the second device 300, and may form a Bluetooth BR/EDR connection (S28050).

Thereafter, the first device 200 and the second device 300 may provide a service through Bluetooth BR/EDR.

As described above, power consumption can be reduced and the time according to a connection can be reduced by connecting Bluetooth BR/EDR through Bluetooth LE, that is, low power communication means.

Figure 32:
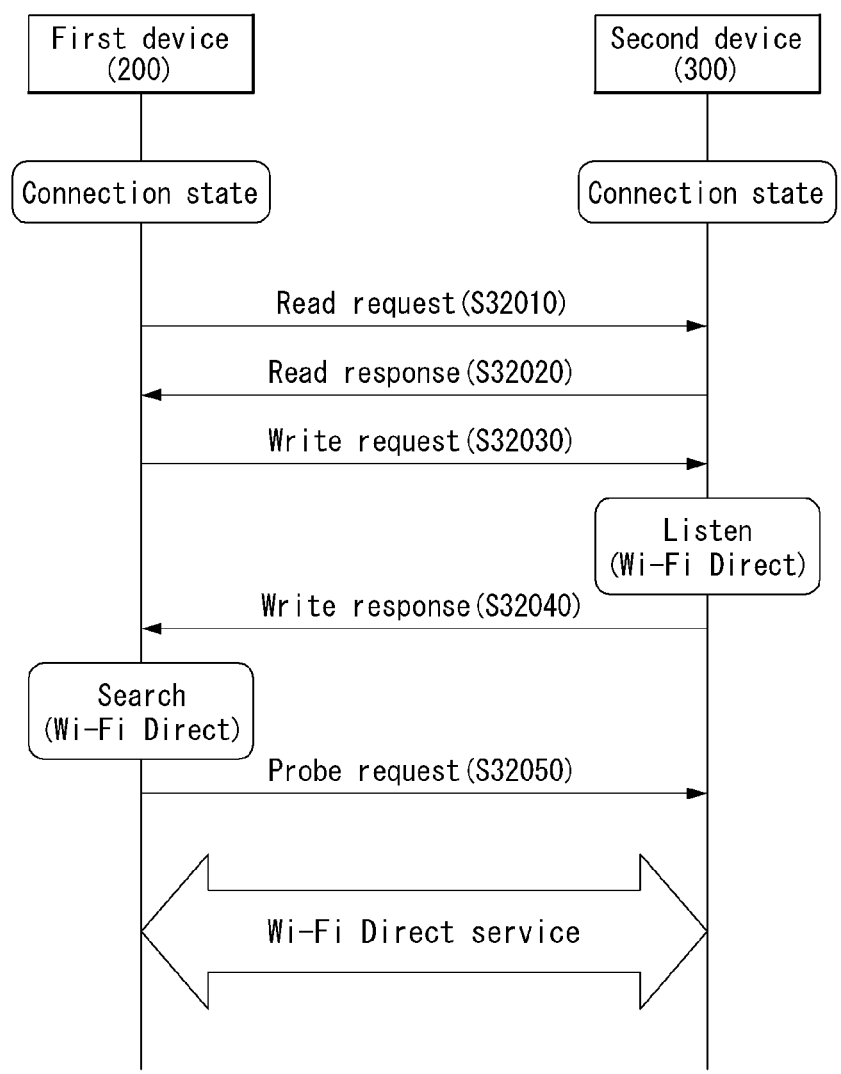
FIG. 32 is a diagram showing an example of a method for handover to Wi-Fi Direct through Bluetooth LE according to an embodiment of the present invention.

FIG. 32 is a diagram showing an example of a method for handover to Wi-Fi Direct through Bluetooth LE according to an embodiment of the present invention.

Referring to FIG. 32, the first device 200 may obtain information of a network interface supported by the second device 300, through the method described in FIGS. 24 to 27, and may perform handover from Bluetooth LE to Wi-Fi Direct.

Specifically, the first device 200 may obtain information of a network interface supported by the second device 300 through the method described in FIGS. 24 to 27, and may form a Bluetooth LE connection by transmitting a connection request message to the second device 300.

Thereafter, the first device 200 and the second device 300 may enter the connection state.

If the Bit3 of the SDS Flags field of the advertising message of FIG. 10 is '1' or the first device 200 requires additional information, the first device may make a read request for an additional information request from the second device (S32010).

The read request is a message for requesting information stored in the GATT database of the second device 300.

In this case, the GATT database of the second device 300 and a data format may be the same as those described in FIGS. 29 to 31.

The first device 200 may receive the requested additional information from the second device 300 through a read response as a response to the read request (S28020).

Thereafter, the first device 200 may transmit a write request message to the second device 300 in order to request the ON of Wi-Fi Direct, that is, a substitution communication technology to be connected, and the activation of a service (S32030).

The write request is for requesting the writing of the Handover Control Point characteristic of the GATT database of the second device 300. In this case, the first device 200 may request the activation of some (e.g., Miracast) or all of services supportable by the second device 300 through the write request.

The second device 300 that has received the write request message may enter the listen state of Wi-Fi Direct.

The second device 300 may receive a write response as a response to the write request (S32040).

The second device 300 activates the ON of Wi-Fi Direct, that is, substitution communication means, and the service in response to the request from the first device 200. In this case, the second device 300 may activate only some or all of services requested by the first device 200.

The first device 200 that has received the write response message may enter the search state of Wi-Fi Direct, may transmit a probe request message to the second device 300, and may form a Wi-Fi Direct connection (S32050).

Thereafter, the first device 200 and the second device 300 may provide service through Wi-Fi Direct.

As described above, power consumption can be reduced and time taken for a connection can be reduced by connecting Wi-Fi Direct through Bluetooth LE, that is, low power communication means.

Figure 33:
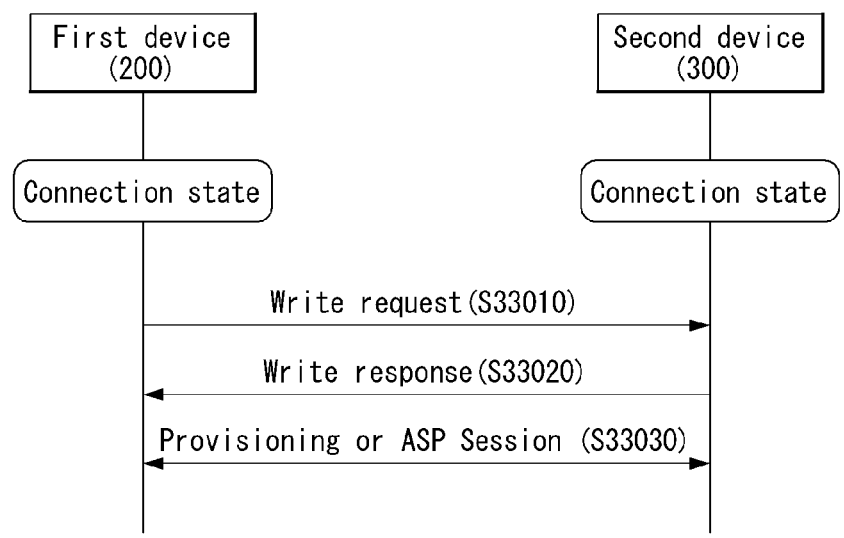
FIG. 33 is a diagram showing another example of a method for handover to Wi-Fi Direct through Bluetooth LE according to an embodiment of the present invention.

FIG. 33 is a diagram showing another example of a method for handover to Wi-Fi Direct through Bluetooth LE according to an embodiment of the present invention.

Referring to FIG. 33, the first device 200 may obtain information of a network interface supported by the second device 300 through the method described in FIGS. 24 to 27, and may then perform handover from Bluetooth LE to Wi-Fi Direct.

First, step S33010 and step S33020 are the same as step S32030 and step S32040 of FIG. 32, and thus a description thereof is omitted.

Thereafter, the first device 200 and the second device 300 may handover to Wi-Fi Direct by performing a provisioning procedure or an ASP Session establishment procedure.

Figure 34:
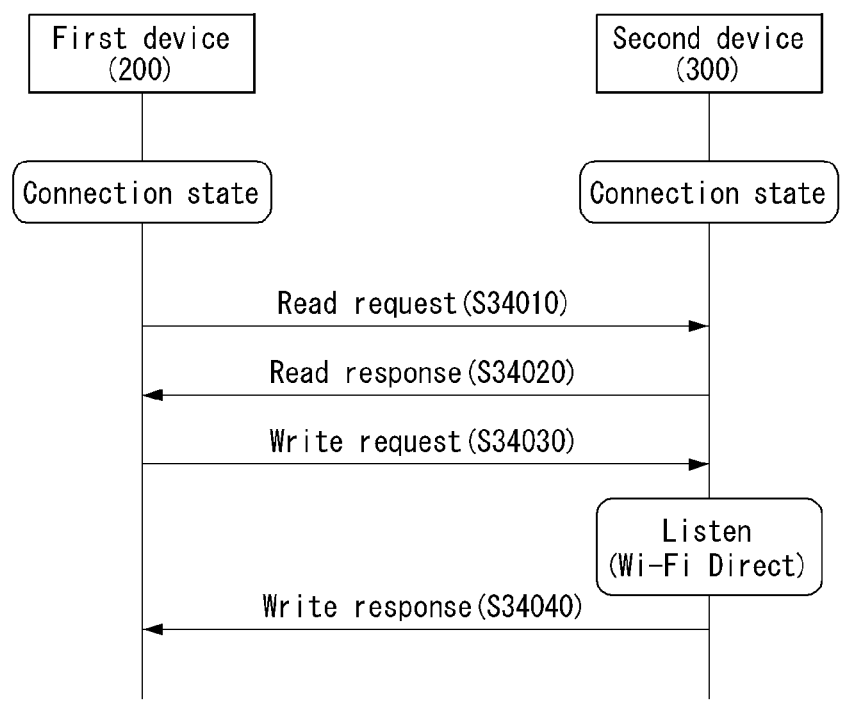
FIG. 34 is a diagram showing yet another example of a method for handover to Wi-Fi Direct through Bluetooth LE according to an embodiment of the present invention.

FIG. 34 is a diagram showing yet another example of a method for handover to Wi-Fi Direct through Bluetooth LE according to an embodiment of the present invention.

Referring to FIG. 34, unlike in FIG. 32, if the second device cannot perform handover to Wi-Fi Direct, it may transmit a message indicative of a handover failure to the first device.

First, step S34010 to step S34030 are the same as step S32010 to step S32030 of FIG. 32, and thus a description thereof is omitted.

Thereafter, if the second device 300 cannot perform handover to Wi-Fi Direct, it may transmit a write response message to the first device 200 (S34040).

In this case, the write response message may include result code indicating that the handover to Wi-Fi Direct has failed and a cause field indicative of a reason for the failure (e.g., the shortage of resources).

Table 7 below shows an example of the response message.

TABLE 7

| Result code | Reason for failure |
|---|---|
| Ex.) 0x04 (Operation Failed) | Ex.) Wi-Fi Direct handover failure attributable to the shortage of resources |

Figure 35:
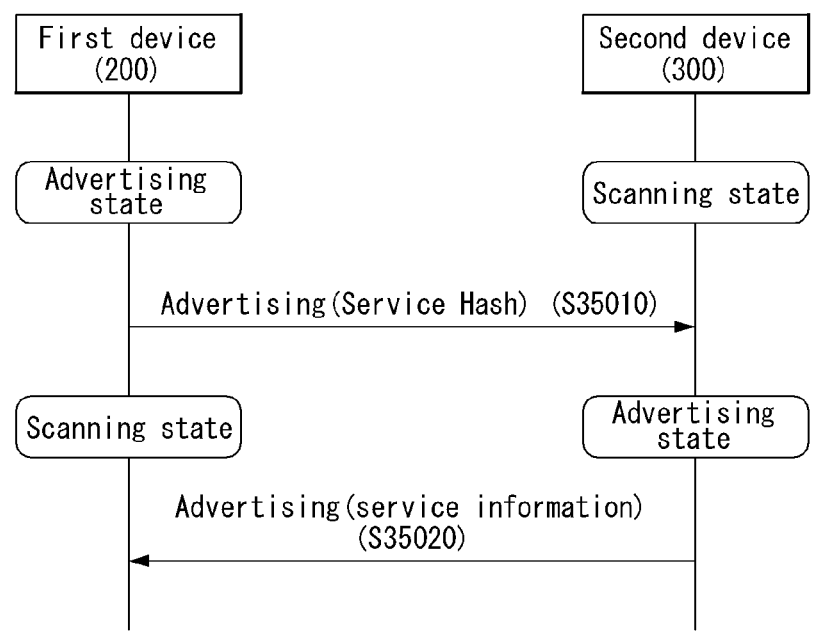
FIG. 35 is a diagram showing an example of a method for obtaining service information through Bluetooth LE according to an embodiment of the present invention.

FIG. 35 is a diagram showing an example of a method for obtaining service information through Bluetooth LE according to an embodiment of the present invention.

Referring to FIG. 35, the first device 200 may receive information of a network interface or service information from the second device 300 in the state in which a Bluetooth LE connection has not been established (connectionless state).

Specifically, as shown in FIG. 34, the first device 200 may broadcast an advertising message (first advertising message) for notifying the second device 300 of the presence of the first device (S35010).

In this case, the advertising message may be transmitted to a plurality of devices in a broadcast manner through an advertising channel as described above, and may include a service hash field including a service hash value for checking whether the second device supports Wi-Fi Direct or whether the second device supports a specific service of Wi-Fi Direct.

The service hash value has a size of 6 bytes for each service. For example, 12 bytes are necessary in order for the first device 200 to check whether two services of Wi-Fi Direct can be supported for the second device 300.

The service hash value may be a hash value obtained by deriving a result value of 256 bits using the service name (UTF-8 String) of a specific service of Wi-Fi Direct as the input value of a hash algorithm (SHA256) and extracting only the 6 bytes of the result value.

For example, if the service name is an "org.wifi.example" string value, a service hash value corresponding to the service name may be "4e-ce-7e-64-39-49." The first device 200 may ask the second device 300 whether the "org.wifi.example" service is present using the hash value.

The second device 300 may receive an advertising message transmitted by the first device 200 in the scanning state, and may check whether it has a specific service by counting backward the service hash value of the service hash field through the same hash algorithm as that of the first device 200.

Thereafter, the second device 300 enters the advertising state. If the specific service is supported, it may transmit service information, including the service name of the specific service, to the first device 200 through an advertising message (second advertising message) (S35020).

The first device 200 that has received the second advertising message can be aware that the second device 300 supports which network interface and service, and may perform handover to a specific network interface along with the second device 300 based on the supported network interface and service.

Figure 36:
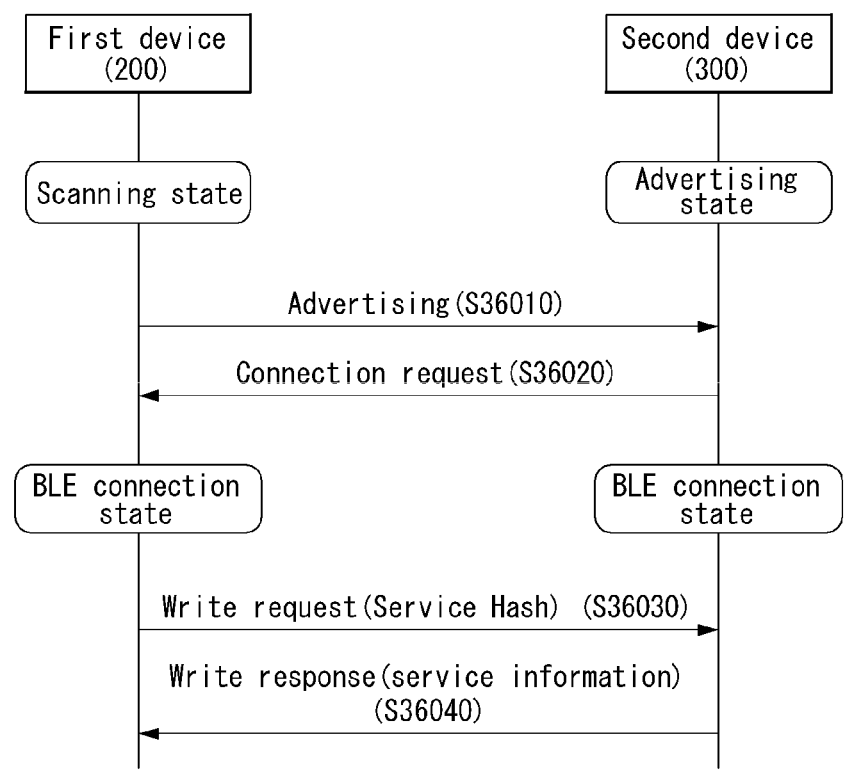
FIG. 36 is a diagram showing another example of a method for obtaining service information through Bluetooth LE according to an embodiment of the present invention.

FIG. 36 is a diagram showing another example of a method for obtaining service information through Bluetooth LE according to an embodiment of the present invention.

Referring to FIG. 36, the first device 200 may receive information of a network interface or service information from the second device 300 in the state in which a Bluetooth LE connection has been established (connection state).

Specifically, the first device 200 may form a Bluetooth LE connection with the second device 300 by receiving an advertising message transmitted by the second device 300 in the scanning state (S36010) and transmitting a connection request message to the second device 300 (S36020).

Thereafter, the first device 200 may ask the second device 300 whether it supports a specific service of Wi-Fi Direct by transmitting a write request message, including the service hash value described in FIG. 35, or a read request message to the second device 300 (S36030).

The second device 300 that has received the write request message may check whether it has the specific service by performing counting-backward through the same hash algorithm as that of the first device 200 as described in FIG. 35.

Thereafter, if the specific service is supported, the second device 300 transmits a write response message, including the service name of the specific service included in the service information characteristic of the GATT Database, or a read response message to the first device 200 (S36040).

The first device 200 that has received the write response message can be aware that the second device 300 supports which network interface and service, and may perform handover to a specific network interface along with the second device 300 based on the supported network interface and service.

Figure 37:
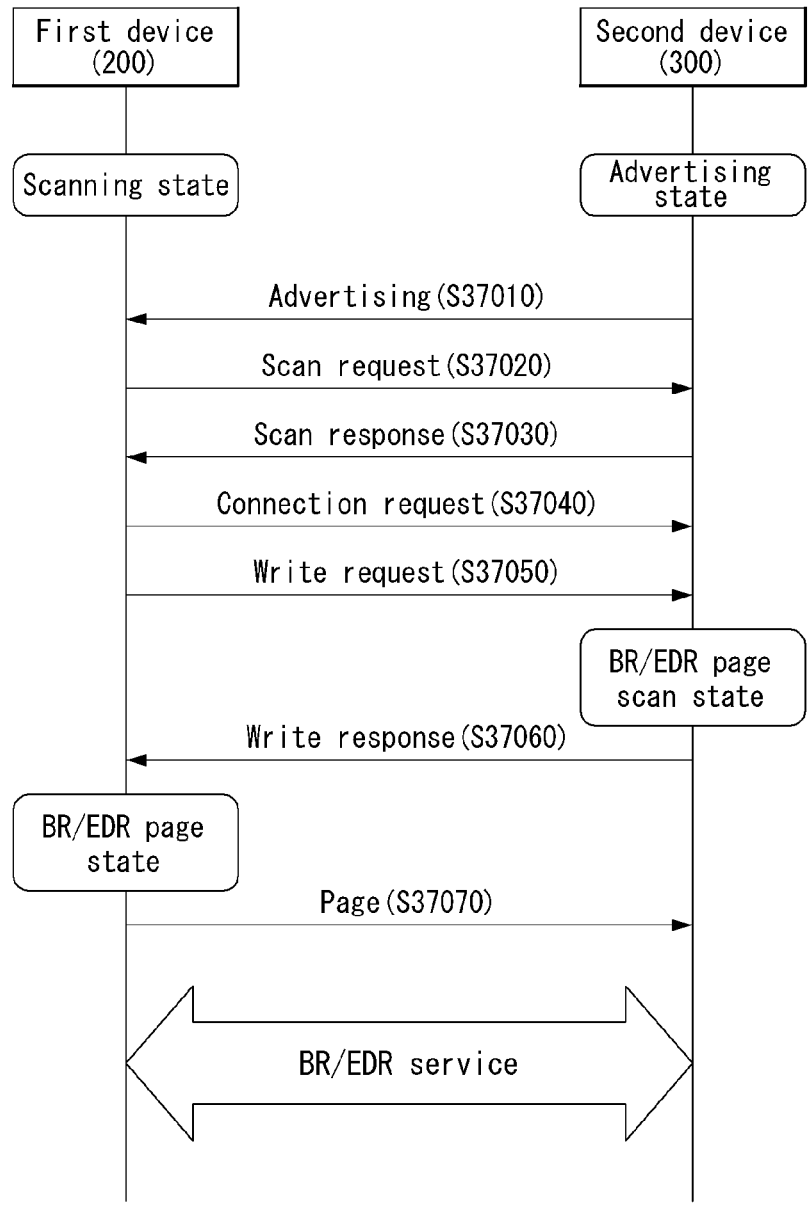
FIG. 37 is a diagram showing an example of a method for handover to Bluetooth BR/EDR through Bluetooth LE according to an embodiment of the present invention.

FIG. 37 is a diagram showing an example of a method for handover to Bluetooth BR/EDR through Bluetooth LE according to an embodiment of the present invention.

Referring to FIG. 37, the first device 200 may perform handover to LE Bluetooth BR/EDR through Bluetooth along with the second device 300 using the method described in FIGS. 24 to 31.

First, step S37010 to step S37030 are the same as step S24010 to step S24030 of FIG. 24, and thus a description thereof is omitted.

Thereafter, the first device 200 may form a Bluetooth LE connection by transmitting a connection request message to the second device 300, and may enter the connection state (S37040).

Thereafter, the first device 200 may transmit a write request message to the second device 300 in order to request the ON of Bluetooth BR/EDR, that is, a substitution communication technology to be connected, and the activation of a service (S37050).

The write request is to request the writing of the Handover Control Point characteristic of the GATT database of the second device 300. In this case, the first device 200 may request the activation of some or all of services supportable by the second device 300 through the write request.

The second device 300 that has received the write request message may enter the BR/EDR page scan state described in FIG. 6.

The second device 300 may receive a write response as a response to the write request (S37060).

The second device 300 activates the ON of Bluetooth BR/EDR, that is, substitution communication means, and the service in response to the request from the first device 200. In this case, the second device 300 may activate only some or all of the services requested by the first device 200.

The first device 200 that has received the write response message may enter the BR/EDR page state described in FIG. 6, and may form a Bluetooth BR/EDR connection by transmitting a page message to the second device 300 (S37070).

Thereafter, the first device 200 and the second device 300 may provide services through Bluetooth BR/EDR.

Figure 38:
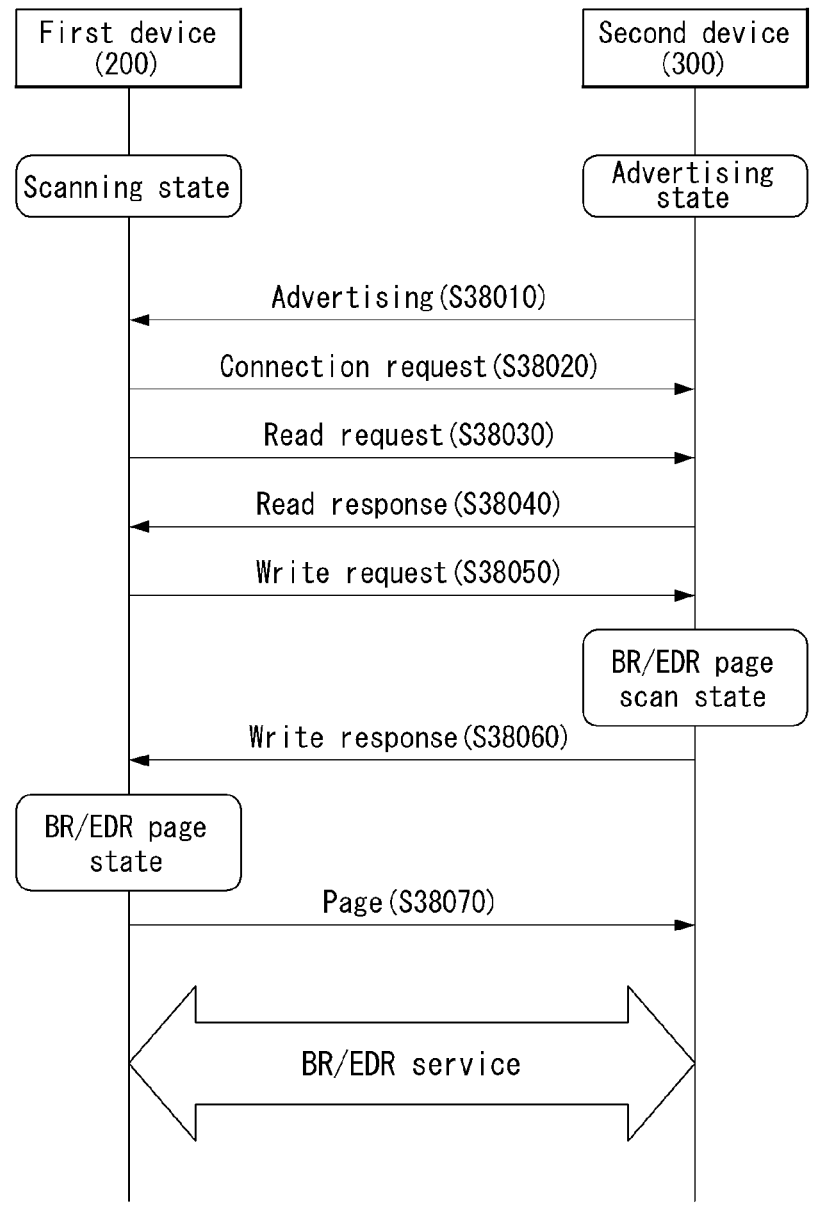
FIG. 38 is a diagram showing another example of a method for handover to Bluetooth BR/EDR through Bluetooth LE according to an embodiment of the present invention.

FIG. 38 is a diagram showing another example of a method for handover to Bluetooth BR/EDR through Bluetooth LE according to an embodiment of the present invention.

Referring to FIG. 38, the first device 200 may perform handover to Bluetooth BR/EDR through Bluetooth LE along with the second device 300 the method described in FIGS. 24 to 31.

Specifically, as described in FIGS. 24 to 27, the first device 200 may obtain information of a network interface supported by the second device 300 through an advertising message received from the second device 300 (S38010), may form a Bluetooth LE connection by transmitting a connection request message to the second device 300, and may enter the connection state (S38020).

Figure 28:
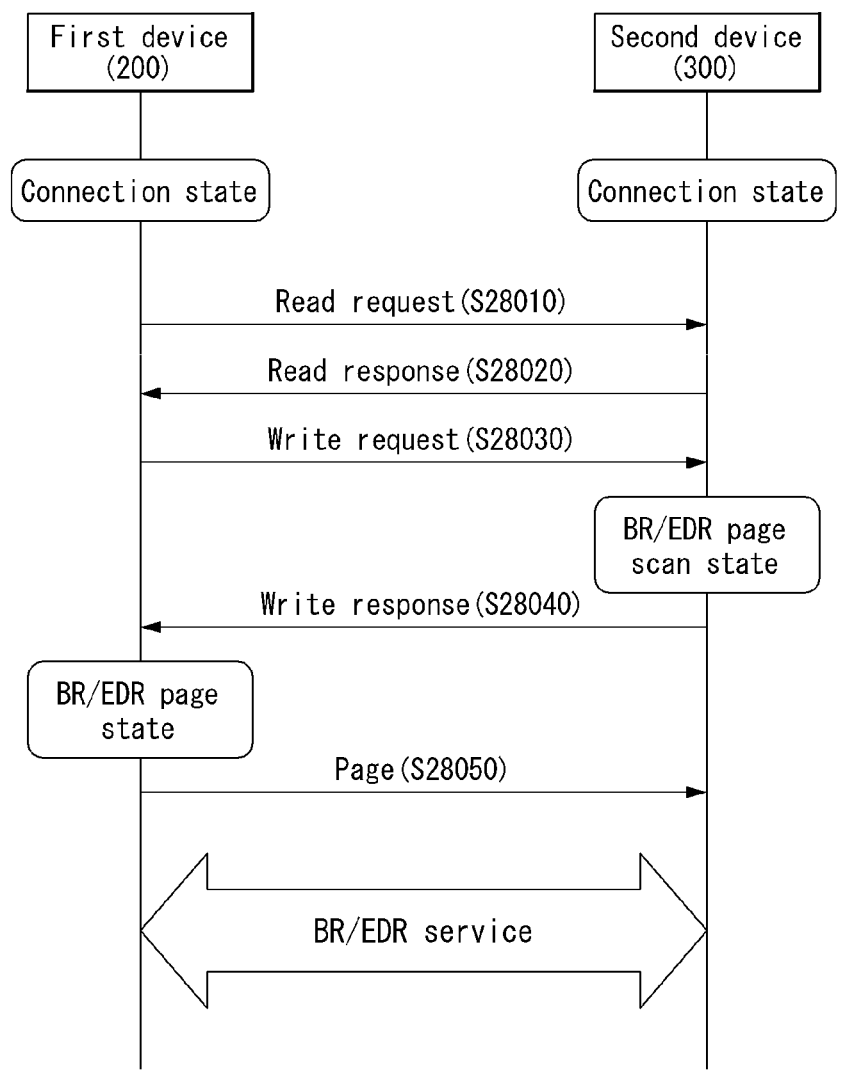

Thereafter, step S38030 to step S38080 are the same as step S28010 to step S28050 of FIG. 28, and thus a description thereof is omitted.

The present invention described above may be substituted, modified, and changed in various ways by a person having ordinary skill in the art to which the present invention pertains without departing from the technological spirit of the present invention, and is not restricted by the aforementioned embodiments and the accompanying drawings.

Furthermore, the drawings have been divided and described for convenience of description, but the embodiments described with reference to the drawings may be merged to implement a new embodiment. Furthermore, the range of right of the present invention also includes designing a computer-readable recording medium in which a program for executing the aforementioned embodiments has been written according to the needs of those skilled in the art.

INDUSTRIAL APPLICABILITY

This specification relates to a Bluetooth connection between devices and, more particularly, to Bluetooth low energy (LE) and a device scan, connection and handover of BR/EDR.

The invention claimed is:

1. A method for connecting, by a first device, to a second device using Bluetooth low energy (LE), the method comprising:

receiving a first advertising message including first interval information indicating a transmission interval of an advertising message from the second device;

adjusting a size of a scan window for scanning a surrounding device based on the first advertising message;

receiving a second advertising message from the second device or an external device through the scan window; and establishing a Bluetooth LE connection with the second device, wherein the second advertising message is periodically transmitted according to the transmission interval, wherein the first interval information is used to reduce or increase the size of the scan window for receiving the periodically transmitted second advertisement message, and wherein the size of the scan window is increased or decreased according to the first interval information.

2. The method of claim 1, further comprising:

dropping the second advertising message when the transmission interval indicated by the first interval information is not identical with an interval in which the first advertising message and the second advertising message are transmitted.

3. The method of claim 2, further comprising:

receiving a third advertising message from the second device; and establishing a Bluetooth LE connection with the second device.

4. The method of claim 1, wherein the first advertising message further includes second interval information indicating an advertising message transmission interval of a third device.

5. The method of claim 4, wherein the size of the scan window is adjusted based on at least one of the first interval information and the second interval information.

6. The method of claim 1, further comprising:

transmitting a scan request message requesting additional information to the second device; and receiving a scan response message comprising the additional information in response to the scan request message.

7. The method of claim 1, further comprising:

receiving at least one of active period information indicating a period in which the second device transmits the advertising message or sleep period information indicating a period in which the second device does not transmit the advertising message from the second device; and adjusting the size of the scan window based on at least one of the active period information or the sleep period information.

8. The method of claim 1, wherein the first advertising message further includes at least one network information supported by the second device.

9. The method of claim 1, wherein the size of the scan window is a size capable of receiving a specific number of advertisement messages from the second device after the first advertising message is received.

10. The method of claim 1, further comprising:

receiving a third advertising message from the second device or the external device, wherein the second advertising message is dropped together with the third advertising message when the second advertising message and the third advertising message are received at the same time, and wherein the third advertising message is dropped when the transmission interval indicated by the first interval information is not identical with an interval in which the first advertising message and the third advertising message are transmitted.

11. A first device for connecting to a second device using Bluetooth low energy (LE), comprising:
a communication unit for communicating with an outside in a wired or wireless manner; and
a processor functionally connected to the communication unit,
wherein the processor is configured to,
receive a first advertising message including first interval information indicating of a transmission interval of an advertising message from the second device,
adjust a size of a scan window for scanning a surrounding device based on the first advertising message,
receive a second advertising message from the second device or an external device through the scan window, and
establish a Bluetooth LE connection with the second device,
wherein the second advertising message is periodically transmitted according to the transmission interval,
wherein the first interval information is used to reduce or increase the size of the scan window for receiving the periodically transmitted second advertisement message, and
wherein the size of the scan window is increased or decreased according to the first interval information.

12. The device of claim 11, wherein the processor is further configured to,
drop the second advertising message when the transmission interval indicated by the first interval information is not identical with an interval in which the first advertising message and the second advertising message are transmitted.

* * * * *